(12) United States Patent
Nakayama

(10) Patent No.: US 8,155,324 B2
(45) Date of Patent: Apr. 10, 2012

(54) VOICE PROCESSOR, VOICE PROCESSING METHOD, PROGRAM, AND INFORMATION RECORDING MEDIUM

(75) Inventor: Hiroyuki Nakayama, Tokyo (JP)

(73) Assignee: Konami Digital Entertainment Co. Ltd., Tokyo (JP)

( * ) Notice: Subject to any disclaimer, the term of this patent is extended or adjusted under 35 U.S.C. 154(b) by 956 days.

(21) Appl. No.: 12/159,610

(22) PCT Filed: Nov. 27, 2006

(86) PCT No.: PCT/JP2006/323600
§ 371 (c)(1),
(2), (4) Date: Jun. 27, 2008

(87) PCT Pub. No.: WO2007/077696
PCT Pub. Date: Jul. 12, 2007

(65) Prior Publication Data
US 2009/0180624 A1 Jul. 16, 2009

(30) Foreign Application Priority Data
Dec. 28, 2005 (JP) .................... 2005-377381

(51) Int. Cl.
*H04R 5/00* (2006.01)
(52) U.S. Cl. ............... 381/17; 381/1; 381/63; 381/61; 463/35; 345/419
(58) Field of Classification Search ............ 381/17, 381/61, 63; 463/35; 345/419
See application file for complete search history.

(56) References Cited

U.S. PATENT DOCUMENTS
2004/0063501 A1    4/2004   Shimokawa
2005/0182608 A1    8/2005   Jahnke FOREIGN PATENT DOCUMENTS
JP      09-102051       4/1997
JP      10-165645       6/1998
JP      2000267675 A    9/2000
JP      2002-148070     5/2002

OTHER PUBLICATIONS

Supplementary European Search Report of Oct. 16, 2009 for European Application No. EP06833404, 3 pages.
International Search Report PCT/JP2006/323600.

*Primary Examiner* — Steven Loke
*Assistant Examiner* — Cuong Nguyen
(74) *Attorney, Agent, or Firm* — Howard & Howard Attorneys PLLC

(57) ABSTRACT

A calculating unit (201) arranges a three-dimensional spatial body containing a listening point within a virtual space in a voice processor (200). The three-dimensional spatial body is constituted by a group of predetermined unit figures. The calculating unit (201) acquires a distribution of a region and an amount of overlap between a region occupied by the three-dimensional spatial body and a region occupied by predetermined objects. A modifying unit (202) modifies reflected sounds of sounds by the predetermined objects based on the distribution of the region of overlap and the amount of overlap acquired by the calculating unit (201). An outputting unit (203) outputs the reflected sounds modified by the modifying unit (202).

5 Claims, 17 Drawing Sheets

VOICE PROCESSOR, VOICE PROCESSING METHOD, PROGRAM, AND INFORMATION RECORDING MEDIUM

TECHNICAL FIELD

The present invention relates to a voice processor, voice processing method, program, and information recording medium suitable for obtaining a stereophonic effect within a virtual space.

BACKGROUND ART

Simulation games which place a viewpoint in a position within a virtual space and display a virtual image composed from that viewpoint are well known. With such games, objects are arranged within a virtual space and a virtual image of objects from the viewpoint is derived and displayed based on the distance from the viewpoint to the object, the direction, and so on, thus creating a sense of reality as though the user were within the virtual space.

To further heighten the sense of reality of the virtual space, it is desirable to simulate sound effects in addition to such visual effects. For example, in Patent Literature 1, a three-dimensional game device for composing a virtual image and game sounds from the viewpoint inside the virtual space is disclosed. The game device can thus, based on the distance between a moving body traveling through the virtual space (for example, a vehicle) and a fixed object (for example, a wall along a road) and the speed of the moving body, change the virtual reflected sound from the fixed object. For example, when uniform walls are present on both left and right sides in the direction of travel of the vehicle, the reflected sound of the engine sound, etc., from the left-side wall is made relatively louder as the left-side wall is approached, and the reflected sound of the engine sound, etc., from the right-side wall is made relatively louder as the right-side wall is approached, based on the distance from the walls and the speed of the vehicle. Also, the greater the speed of the vehicle, the louder the sound is made reflected from the side wall.
Patent Literature 1: Japanese Patent No. 3123957

DISCLOSURE OF INVENTION

Problem to be Solved by the Invention

However, in the real world, if reflected sounds of sounds emitted by a moving body such as the vehicle above are considered for example, it is common that the fixed objects producing the reflected sounds are not just side walls formed with a comparably uniform shape, but also to have three-dimensional unevennesses and complex shapes. Furthermore, by mixing with reflected sounds from other moving bodies such as oncoming vehicles, complex sound effects are produced. These sound effects are various, including change of the volume and change of the localization of the reflected sounds, as well as weakening specific frequency components in the sounds (so-called "muffling of the sound"), reverberating the sounds (so-called "echo"), and so on. However, according to Patent Literature 1, changes in volume, localization, and height can only be expressed based on a two-dimensional positional relationship between the moving body and objects. This is therefore insufficient for obtaining a stereophonic effect within a virtual space, making it impossible to perform a sound simulation of a situation which can arise in the real world.

The present invention is intended to solve this problem. The purpose of the present invention is to provide a voice processor, voice processing method, program, and information recording medium favorable for obtaining a stereophonic effect within a virtual space.

Means for Solving the Problem

To achieve the above objective, the following invention will be disclosed according to the principle of the present invention.

The voice processor according to a first aspect of the present invention comprises a calculating unit, a modifying unit, and an outputting unit.

The calculating unit calculates an amount of overlap between a region occupied by a three-dimensional spatial body containing an arrival point of sound reflected by an object arranged within a virtual space, and the object.

The modifying unit modifies a reflected sound reflected by the object based on the amount of overlap calculated by the calculating unit.

The outputting unit outputs a reflected sound modified by the modifying unit as a sound to be acquired at the arrival point.

As a result, the voice processor can modify a sound reflected by any object simply and without performing exacting and complex calculations. It is also possible to obtain stereophonic effect within a virtual space. It is also possible to perform a sound simulation of situations which can occur in the real world, and to create a sense of reality within a virtual space.

For example, the calculating unit can calculate the volume of the region in which the three-dimensional spatial body and the object overlap as the amount of overlap.

For example, the calculating unit can calculate the surface area of the area in which the three-dimensional spatial body and the object overlap as the amount of overlap.

The voice processor can thus modify a sound reflected by any object simply and without performing exacting and complex calculations, by acquiring a volume or a surface area.

For example, the modifying unit can increase the volume of the reflected sound as the amount of overlap grows larger.

The voice processor can thus control the volume of reflected sound without performing exacting and complex calculations, and can thus add effects which create a sense of reality in a virtual space.

For example, the modifying unit can modify the localization of the reflected sound, using a distribution of regions in which the three-dimensional spatial body and the objects overlap.

The voice processor can thus control the localization of reflected sound without performing exacting and complex calculations, and can thus add effects which create a sense of reality in a virtual space.

The voice processor may further comprise an image generating unit and a visual axis direction acquiring unit. In other words, the image generating unit generates an image in which an object arranged within the virtual space is seen from the arrival point within the virtual space. Further, the visual axis direction acquiring unit acquires from the image generating unit a visual axis direction in which an object arranged within the virtual space is seen from the arrival point.

The calculating unit arranges the three-dimensional spatial body based on the visual axis direction acquired by the visual axis direction acquiring unit and calculates the amount of overlap between the three-dimensional spatial body and the object.

The voice processor can thus modify the localization of a sound such as the reflected sound such that even if the position of the arrival point is the same, if the visual axis direction is different, it matches the visual axis direction, and can thus obtain a sound effect capable of creating a greater sense of reality.

A voice processing method according to another aspect of the present invention comprises a calculating step, a modifying step, and an outputting step.

The calculating step calculates an amount of overlap between a regions occupied by a three-dimensional spatial body containing an arrival point of a sound reflected by an object arranged within a virtual space, and the object.

The modifying step modifies a reflected sound reflected by the object based on the amount of overlap calculated in the calculating step.

The outputting step outputs a reflected sound modified in the modifying step as a sound to be acquired at the arrival point.

As a result, a voice processing method can be provided which can modify a sound reflected by any object simply and without performing exacting and complex calculations. It is also possible to obtain stereophonic effects within a virtual space. It is also possible to perform a sound simulation of situations which can occur in the real world, and to create a sense of reality within a virtual space.

A program according to another aspect of the present invention functions as a calculating unit, a modifying unit, and an outputting unit.

The calculating unit calculates an amount of overlap between a region occupied by a three-dimensional spatial body containing an arrival point of a sound reflected by an object arranged within a virtual space, and the object.

The modifying unit modifies a reflected sound reflected by the object based on the amount of overlap calculated by the calculating unit.

The outputting unit outputs a reflected sound modified by the modifying unit as a sound to be acquired at the arrival point.

As a result, the program can control a computer to function as a device which can modify a sound reflected by any object simply and without performing exacting and complex calculations. It is also possible to obtain stereophonic effects within a virtual space. It is also possible to perform a sound simulation of situations which can occur in the real world, and to create a sense of reality in a virtual space.

An information recording medium according to another aspect of the present invention records a program for controlling a computer to function as a calculating unit for calculating an amount of overlap between a region occupied by a three-dimensional spatial body containing an arrival point of a sound reflected by an object arranged within a virtual space, and the object, a modifying unit for modifying a reflected sound reflected by the object based on the amount of overlap calculated by the calculating unit, and an outputting unit for outputting a reflected sound modified by the modifying unit as a sound to be acquired at the arrival point.

The program of the present invention can be recorded on a computer readable information storage medium, such as a compact disk, a flexible disk, a hard disk, a magneto-optical disk, a digital video disk, a magnetic tape, or a semiconductor memory.

The program can be distributed and sold, independently of a computer which executes the program, over a computer communication network. The information storage medium can be distributed and sold independently of the computer.

Effect of the Invention

According to the present invention, it is possible to obtain stereophonic effects within a virtual space.

Figure 1:
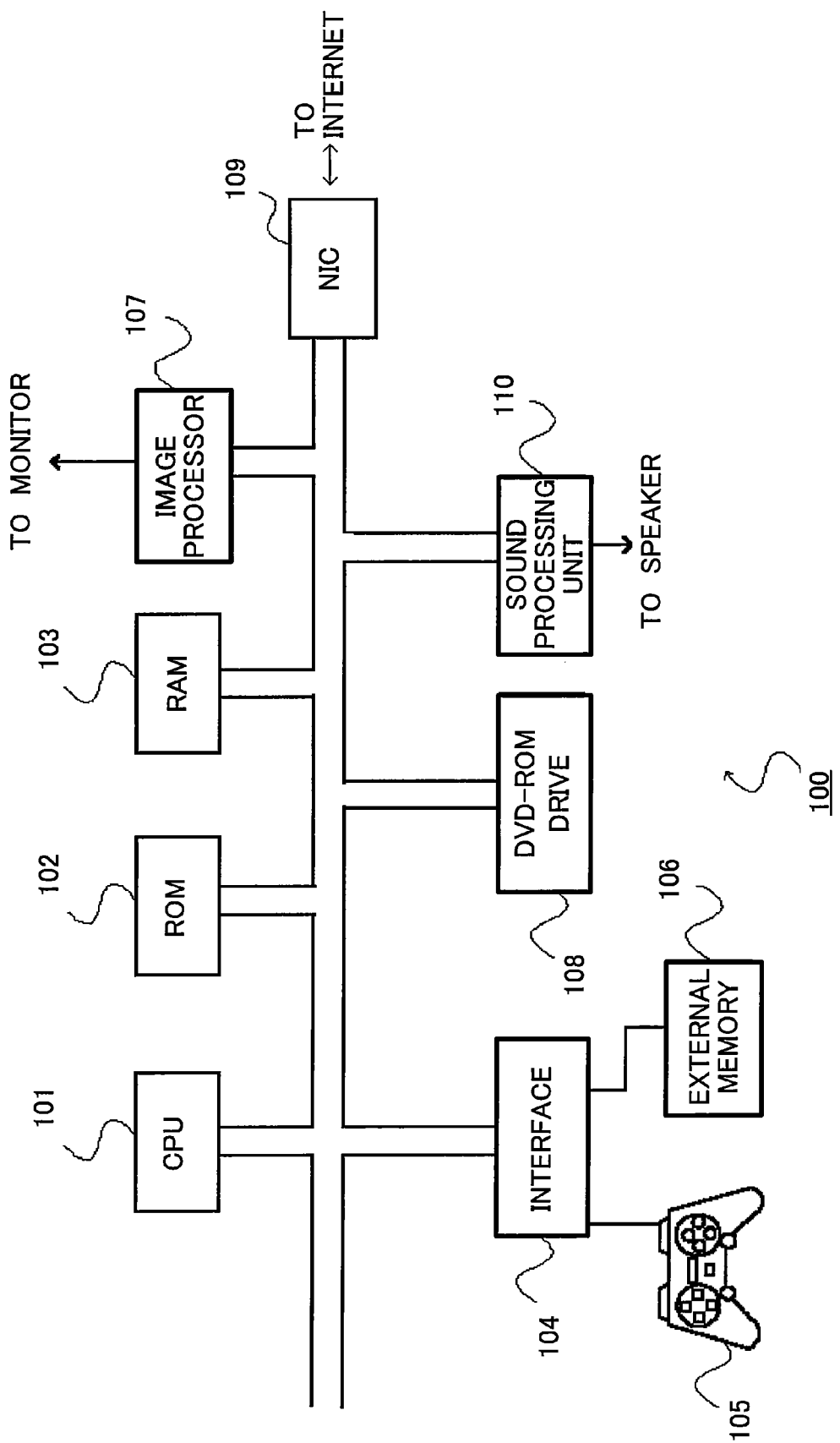
FIG. 1 An explanatory diagram showing a schematic configuration of a typical information processing device on which a voice processor of the present invention is realized.

DESCRIPTION OF REFERENCE NUMERALS 100 information processing device
101 CPU
102 ROM
103 RAM
104 interface
105 controller
106 external memory
107 image processor
108 DVD-ROM drive
109 NIC
110 sound processing unit
200 voice processor
201 calculating unit
202 modifying unit
203 outputting unit
301 listening point (arrival point)
302 three-dimensional spatial body
303 object
351 traveling direction
352 visual axis direction
353 visual range
901 vehicle object
902 building object
911 region distribution of vehicle objects
912 region distribution of building objects
1201 image generating unit
1202 visual axis direction acquiring unit

BEST MODE FOR CARRYING OUT THE INVENTION

An embodiment of the present invention will be described below. For ease of understanding, an information processing device for games is used to explain one embodiment of the present invention, but the description below is written for explanation, and not to limit the scope of the invention. Therefore, persons skilled in the art can employ embodiments in which each individual element or all the elements are replaced with equivalent ones, and which are also included in the scope of the invention.

Embodiment 1

FIG. 1 is a schematic view showing an overview constitution of a typical information processing device that carries out the function of a voice processor of the present invention by executing a program. A description is given below with reference to this drawing.

An information processing device 100 comprises a CPU (central processing unit) 101, a ROM (read only memory) 102, a RAM (random access memory) 103, an interface 104, a controller 105, an external memory 106, an image processor 107, a DVD-ROM (digital versatile disc ROM) drive 108, an NIC (Network Interface Card) 109, and a sound processing unit 110.

As a DVD-ROM storing a program and data for a game is loaded onto the DVD-ROM drive 108 and the information processing device 100 is powered on, the program is executed to realize the voice processor of the present embodiment.

The CPU 101 controls the general operation of the information processing device 100, and is connected to individual components, and exchanges control signals and data therewith. Further, by using an ALU (arithmetic logic unit) (not shown), the CPU 101 can perform arithmetic operations such as addition, subtraction, multiplication, division, etc., logical operations such as logical addition, logical multiplication, logical negotiation, etc., bit operations such as bit addition, bit multiplication, bit inversion, bit shift, bit rotation, etc., on a storage area, or a register (not shown) which can be accessed at a high speed. Furthermore, the CPU 101 itself may be constituted so as to be able to rapidly perform saturate operations such as addition, subtraction, multiplication, division, etc., for handling multimedia processes, and vector operations such as trigonometric functions, etc., or may realize these with a coprocessor.

An IPL (initial program loader) which is executed immediately after powering on is stored in the ROM 102, and as the IPL is executed, the program stored on the DVD-ROM is read into the RAM 103 and executed by the CPU 101. Further, the ROM 102 stores a program and various data for an operating system necessary for controlling the general operation of the information processing device 100.

The RAM 103 is for temporarily storing data and programs, and retains the program and data read from the DVD-ROM, and other data needed for game execution and chat communication. Further, the CPU 101 performs processes such as providing an area of variables to the RAM 103 to work the ALU directly upon values stored in the variables to perform operations, or once values stored in the RAM 103 are stored in the register, performing operations on the register, and writing operation results back to the memory, etc.

The controller 105 connected via the interface 104 receives an operation input which is made when a player executes the game, such as a mah-jongg game or card game.

The external memory 106 detachably connected via the interface 104 rewritably stores data indicating the play status (past performance, etc.) of a mah-jongg game, etc., data indicating the progress status of the game, data of chat communication logs (records) in a case of a network match-up, and so on. As the user makes an instruction input via the controller 105, this data can appropriately be recorded in the external memory 106.

The program for realizing the game and the image data and sound data accompanying the game are recorded in the DVD- ROM to be loaded onto the DVD-ROM drive 108. Under control of the CPU 101, the DVD-ROM drive 108 performs a process of reading from the DVD-ROM loaded therein to read a necessary program and data, and these are temporarily stored in the RAM 103 or the like.

The image processor 107 processes data read from the DVD-ROM by means of the CPU 101 and an image operation processor (not shown) comprised in the image processor 107, and then records the data in a frame memory (not shown) in the image processor 107. The image information recorded in the frame memory is converted to a video signal at a predetermined synchronous timing, which is in turn output to a monitor (not shown) connected to the image processor 107. Image displays of various types are therefore possible.

The image operation processor can enable fast execution of an overlay operation of a two-dimensional image, a transparent operation such as alpha blending, and various kinds of saturate operations.

It is also possible to enable fast execution of an operation of rendering polygon information which is arranged within a virtual three-dimensional space and to which various kinds of texture information are added, by using a Z buffer method to acquire a rendered image with a downward view of a polygon toward a predetermined viewpoint position, arranged within the virtual three-dimensional space, from the predetermined viewpoint position.

Further, by the cooperation of the CPU 101 and the image operation processor, it is possible to write a string of characters as a two-dimensional image in the frame memory or on each polygon surface according to font information which defines the shapes of characters.

For example, information such as images of mah-jongg tiles or images of cards in a card game are prepared on the DVD-ROM so as to enable display of the current pieces or cards when such information is recorded to the frame memory.

The NIC 109 serves to connect the information processing device 100 to a computer communication network (not shown), such as the Internet, and includes ones compliant with the 10 BASE-T/100 BASE-T standard which is used when configuring a LAN (local area network) or analog modems for connecting to the Internet using a telephone circuit, an ISDN (integrated services digital network) modem, an ADSL (asymmetric digital subscriber line) modem, a cable model for connecting to the Internet using a cable television circuit, or the like, and an interface (not shown) which intervenes between these modems and the CPU 101.

The sound processing unit 110 converts sound data read from the DVD-ROM to an analog sound signal, and outputs the sound signal from a speaker (not shown) connected thereto. Under the control of the CPU 101, the sound processing unit 110 generates sound effects and music data to be generated during progress of the game, and outputs sounds corresponding thereto from a speaker.

In a case where the sound data recorded on the DVD-ROM is MIDI data, the sound processing unit 110 refers to the sound source data included in the data, and converts the MIDI data to PCM data. Further, in a case where the sound data is compressed sound data of ADPCM (adaptive differential pulse code modulation) format or Ogg Vorbis format, etc., the sound processing unit 110 decompresses the data, converting it to PCM data. The PCM data is D/A (digital/analog) converted at a timing corresponding to the sampling frequency of the data and output to the speaker, thereby enabling sound output.

In addition, the information processing device 100 may be configured to achieve the same functions as the ROM 102, the RAM 103, the external memory 106, and the DVD-ROM or the like which is to be loaded onto the DVD-ROM drive 108 by using a large-capacity external storage device, such as a hard disk.

Next, a description of an overview constitution of the voice processor 200 is given with reference to the drawings.

Figure 2:
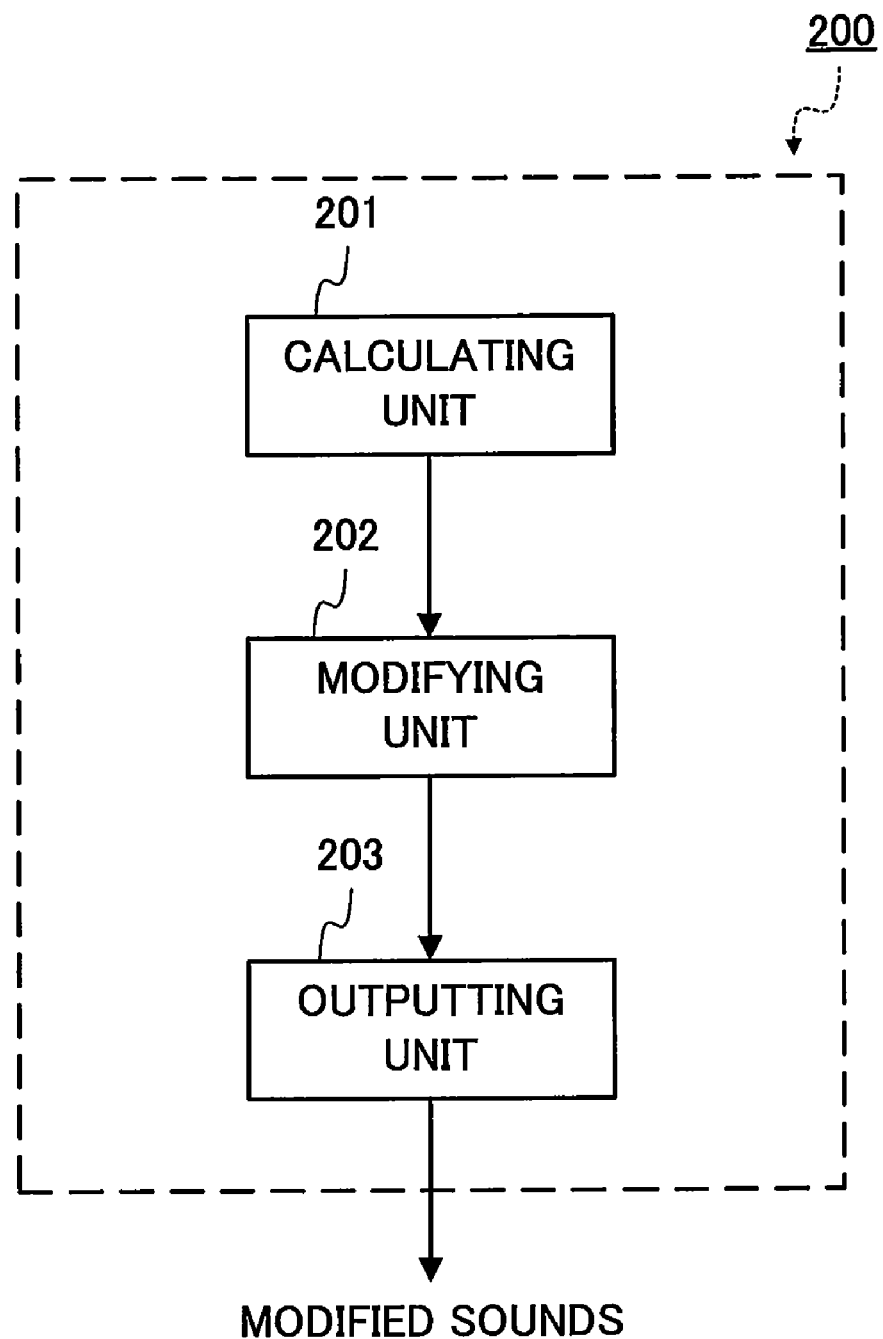
FIG. 2 An explanatory diagram describing a process performed by a voice processor.

FIG. 2 is a schematic diagram showing an overview constitution of the voice processor 200 according to the present embodiment.

Figure 3:
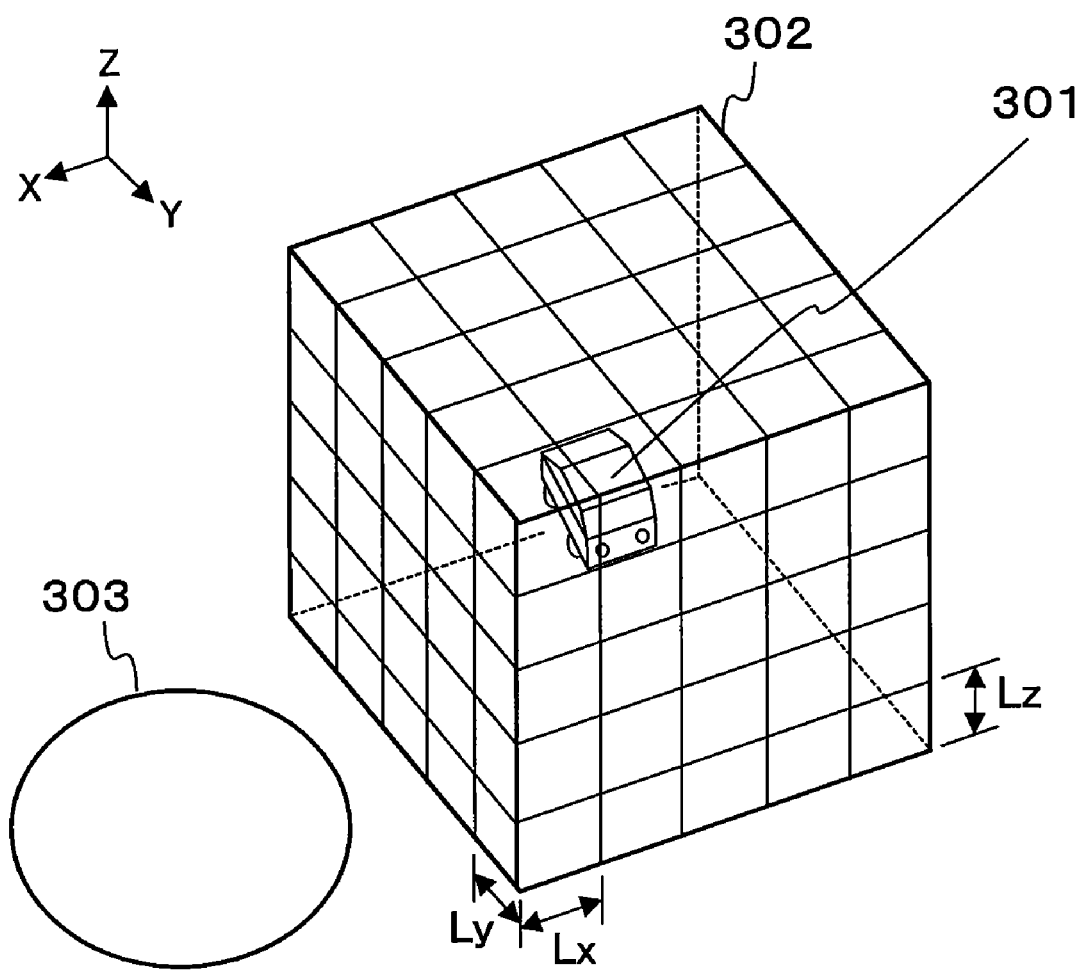
FIG. 3 An explanatory diagram showing an example of a three-dimensional spatial body containing a listening point.

FIG. 3 is a view showing an example in which are arranged an arrival point 301, a three-dimensional spatial body 302 surrounding the arrival point 301, and an object 303.

The voice processor 200 comprises a calculating unit 201, a modifying unit 202, and an outputting unit 203.

The calculating unit 201 acquires an amount of overlap $V_{OBJ}$ between the object 303 and a region occupied by the three-dimensional spatial body 302 including an arrival point of a sound reflected from the object 303 arranged within the virtual space, and inputs the acquired amount $V_{OBJ}$ to the modifying unit 202. Alternately, the calculating unit 201 acquires a distribution of a region of overlap between the object 303 and the three-dimensional spatial body 302 containing the arrival point 301, and inputs data indicating the acquired region distribution into the modifying unit 202.

Moreover, the CPU 101 and the image processor 107 work in cooperation to function as the calculating unit 201.

There are a viewing point and a listening point as assumed points from which the states of characters, etc., arranged within the virtual space are observed. The viewing point is the point from which the virtual space is viewed, and is used in, for example, 3D graphics. The listening point is the point from which sounds within the virtual space are heard, and is used in designing the sound field of a concert hall, for example. The listening point is also the arrival point of a sound wave within the virtual space. To facilitate understanding of the present invention, the arrival point of a sound within the virtual space is called the "listening point." For example, in a case of a car racing game in which users vie for position by operating a vehicle object within the virtual space, the position of the driver's seat in the vehicle object operated by the user is the listening point.

For example, as shown in FIG. 3, the three-dimensional spatial body 302 containing the listening point 301 (arrival point) is a cube surrounding the listening point 301 within the three-dimensional virtual space. This three-dimensional spatial body 302 is constituted as a grouping of unit figures, each figure being a cube with the length of each side being Lx in the x direction, Ly in the y direction, and Lz in the z direction. In this drawing, the three-dimensional spatial body 302 is constituted by a total of 5×5×5=125 unit figures. The three-dimensional spatial body 302 travels within the same virtual space as the absolute position of the listening point 301 travels within the virtual space. In other words, the relative position of the listening point 301 with respect to the three-dimensional spatial body 302 is constant. Moreover, the number of unit figures constituting the three-dimensional spatial body 302 is not limited to this, and can be set to any number. For example, the number of unit figures can also be made variable for each scene in a game.

Further, in a case in which a virtual image is displayed using the listening point 301 as the viewing point, it is desirable that the three-dimensional spatial body 302 be arranged based on the visual axis direction from the viewing point, in order to enhance the sense of reality. It is also typical for the three-dimensional spatial body 302 to be arranged such that the barycentric coordinates of the three-dimensional spatial body 302 match the coordinates of the listening point 301.

The object 303 is displayed as a figure having a arbitrary shape within the virtual space. For example, in the case of a car racing game, the object 303 has a variety of shapes, such as that of obstacles near a course, side walls, buildings, competitors' vehicles, oncoming vehicles, and so on.

The amount of overlap $V_{OBJ}$ is an amount indicating the size of a region of overlap within the virtual space between a region occupied by the three-dimensional spatial body 302 containing the listening point 301 and a region occupied by the object 303.

Figure 4A:
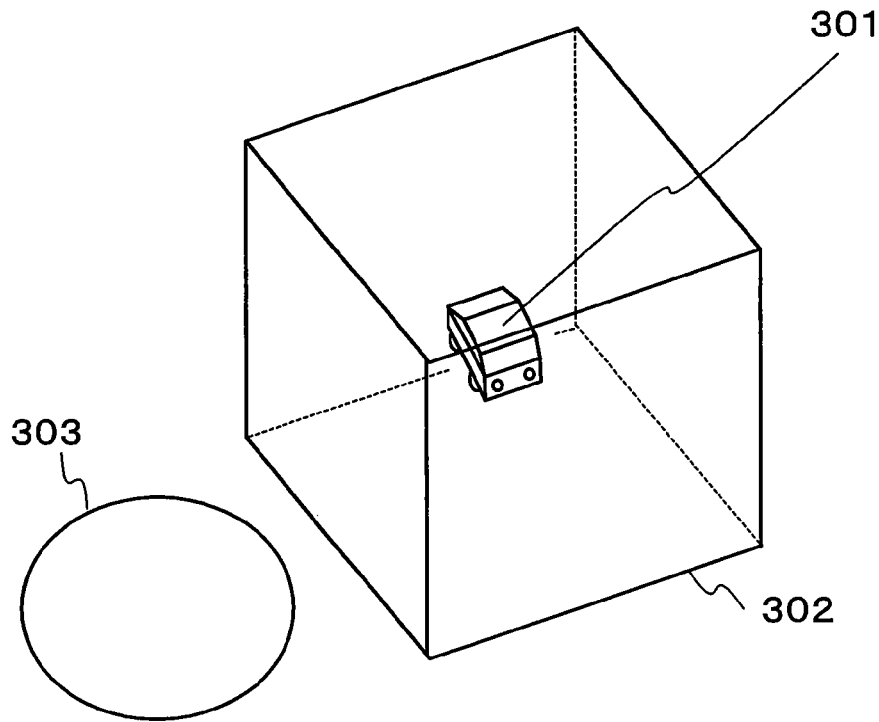
FIG. 4A An explanatory diagram showing an example arrangement of when an object and a three-dimensional spatial body containing a listening point are separated.
Figure 4B:
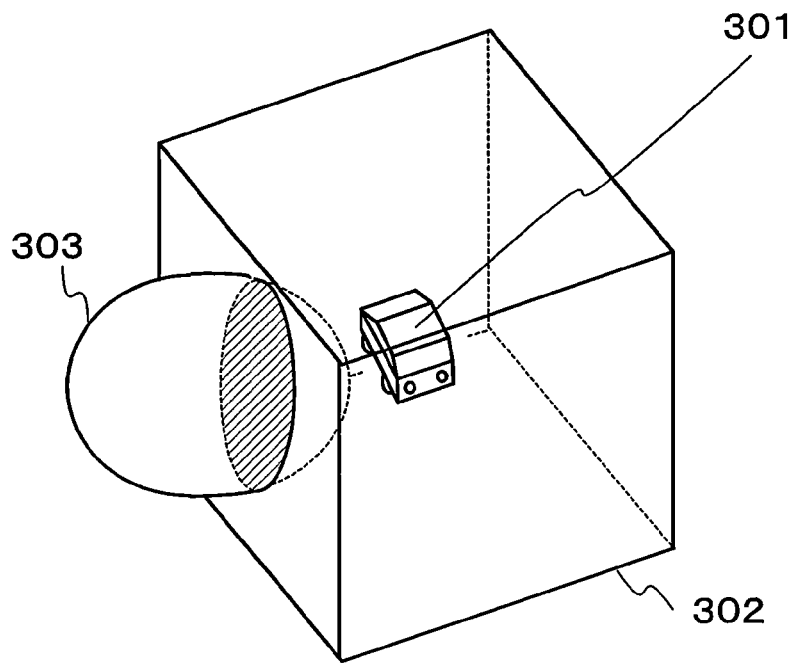
FIG. 4B An explanatory diagram showing an example arrangement of when an object and a three-dimensional spatial body containing a listening point overlap.

For example, as shown in FIG. 4A, if the object 303 and the three-dimensional spatial body 302 containing the listening point 301 are separated, there is no region in which the three-dimensional spatial body 302 and the object 303 overlap, and therefore the amount of overlap $V_{OBJ}$ is zero. On the other hand, as in FIG. 4B, if the three-dimensional spatial body 302 and the object 303 contact, a region of overlap between the two exists, and the amount of overlap $V_{OBJ}$ has a value which is not zero.

The calculating unit 201 acquires as the amount of overlap $V_{OBJ}$ between the three-dimensional spatial body 302 and the object 303 a volume value of the region in which both overlap. Since the shape of the object 303 is arbitrary here, there are cases in which the amount of calculation for accurately acquiring the volume value of the region of overlap is tremendous. With the present embodiment, the calculating unit 201 determines whether or not a region of overlap with the object 303 exists for each unit figure constituting the three-dimensional spatial body 302, and if a region of overlap exists in the unit figures, it deems that those unit figures are a part of the object 303. The calculating unit 201 then makes this determination for all the unit figures, and makes the total value of the volume value of the unit figures that are deemed to be part of the object 303 the volume value of the portion of overlap between the three-dimensional spatial body 302 and the object 303. If the shape of the object 303 is complex, it is also possible to set the smallest figure (for example, a cube or a sphere, etc.) in external contact with the object 303 and approximately the region of overlap between this external contact figure and the three-dimensional spatial body 302 with the region of contact between the object 303 and the three-dimensional spatial body 302.

For example, in FIG. 3, when the X-axis, the Y-axis, and the Z-axis are orthogonal to each other, a volume value $V_{UNIT}$ per unit figure is expressed in Formula 1.

$$V_{UNIT}=Lx \times Ly \times Lz\text{:}\qquad\qquad\text{Formula 1}$$

Assuming the number of unit figures that are deemed to be a part of the object 303 is N (N being an integer greater than 0), the amount of overlap $V_{OBJ}$ is shown in Formula 2.

$$V_{OBJ}=V_{UNIT} \times N\text{:}\qquad\qquad\text{Formula 2}$$

Moreover, it is also possible to deem certain unit figures to be a part of the object 303 if the portion of overlap among those certain unit figures is greater than or equal to a predetermined ratio (for example, 50%).

It is also possible to set a predetermined plural number of determination points within the object 303, and deem that, if those determination points are present within unit figures, then those unit figures are a part of the object 303. Alternately, it is also possible to deem that, if greater than or equal to a predetermined number of determination points are present within unit figures, then those unit figures are a part of the object 303.

Figure 5A:
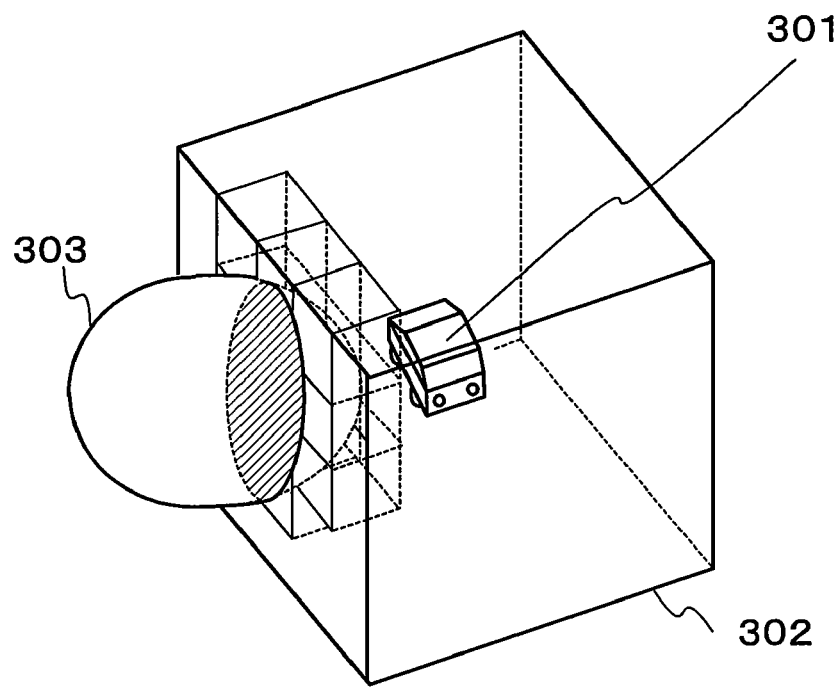
FIG. 5A An explanatory diagram showing an example arrangement in which an object and a three-dimensional spatial body containing a listening point overlap.
Figure 5B:
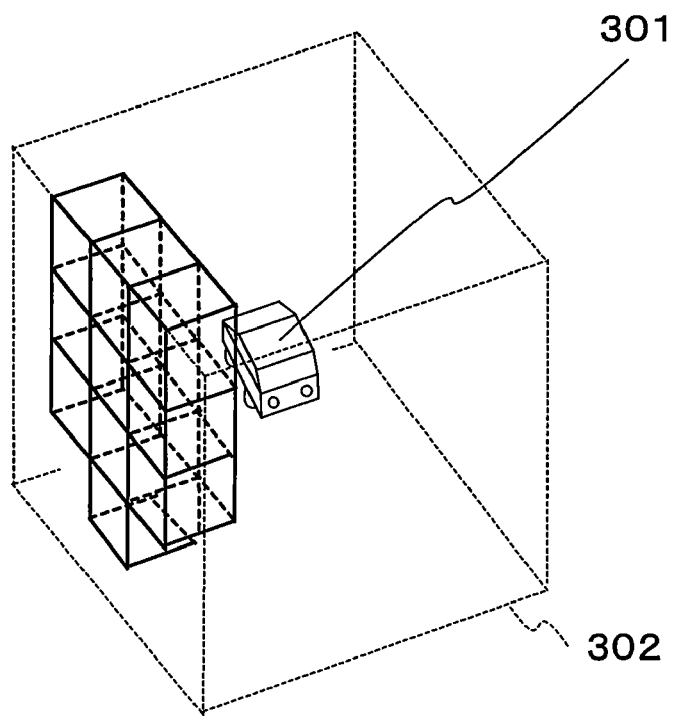
FIG. 5B An explanatory diagram showing an example of a distribution of a region of overlap.

For example, the three-dimensional spatial body 302 is constituted by a total of 125 unit figures, 5 in the X direction, 5 in the Y direction, and 5 in the Z direction, and that a region of overlap exists as in FIG. 5A between the three-dimensional spatial body 302 and the object 303. At this time, the calculating unit 201 uses any of the above methods to determine whether or not the object 303 is present in the unit figures, and deems that 10 unit figures distributed as shown, for example, in FIG. 5B, are a part of the object 303. The calculating unit 201 then obtains a volume value of "10 (the units are arbitrary)" as the amount of overlap $V_{OBJ}$ between the three-dimensional spatial body 302 and the object 303.

It is also possible to acquire this by giving an identification number i (i being an integer greater than 1) to each object 303 in advance, setting a predetermined coefficient K(i) for each object 303, and acquire an amount of overlap V(i) corresponding to unit figure I by multiplying the coefficient K(i) by the volume value $V_{UNIT}$ per unit figure as in Formula 3.

$$V(i)=K(i) \times V_{UNIT}\text{:}\qquad\qquad\text{Formula 3}$$

It is also possible to make the amount of overlap $V_{OBJ}$ the sum of V(i) for all unit figures in the region of overlap between the three-dimensional spatial body 302 and the object 303.

In other words, it is also possible to set a weighting for the amount of overlap V(i) for each unit figure. For example, it is also possible to set this coefficient K(i) in advance based on the material (for example, concrete, steel plate, etc.) or shape (for example, a uniform plane, a plane with holes, etc.) of the object 303 within the virtual space.

Or instead of a volume value, it is also possible to use a number N (N being an integer greater than 0) of unit figures (deemed to be a part of the object 303) in which is present a region of overlap between the object 303 and the three-dimensional spatial body 302 containing the listening point 301 as the amount of overlap $V_{OBJ}$.

Also, instead of a volume value, it is also possible to acquire a ratio of a number N of unit figures (deemed to be a part of the object 303) in which is present a region of overlap with the object 303 to a total number $N_{UNIT}$ of the unit figures constituting the three-dimensional spatial body 302 containing the listening point 301 as in Formula 4, and make the amount of overlap $V_{OBJ}$ the size of this ratio.

$$V_{OBJ}=N/N_{UNIT}\text{:}\qquad\qquad\text{Formula 4}$$

The modifying unit 202 performs sound processing in which a sound reflected from the object 303 (for example, the reflected sound of an engine sound of a vehicle) based on the amount of overlap $V_{OBJ}$ between this object 303 and the three-dimensional spatial body 302 containing the listening point 301 (for example, the volume value), or the region distribution thereof, acquired by the calculating unit 201. The modifying unit 202 inputs information indicating the modification of the reflected sound (for example, parameters, etc., which set the volume and localization, etc., after the modification) to the outputting unit 203.

Moreover, the CPU 101 and the sound processing unit 110 work in cooperation to function as the modifying unit 202.

For example, the modifying unit 202 can modify the volume of a sound reflected from the object 303 based on the volume value acquired by the calculating unit 201. In other words, the larger the volume value of the region of overlap between the object 303 and the three-dimensional spatial body 302 containing the listening point 301, the larger the volume of a sound reflected from the object 303 can be increased by the modifying unit 202.

For example, the modifying unit 202 can modify the localization (position of the sound source) of a sound reflected from the object 303 based on the region distribution acquired by the calculating unit 201. In other words, the modifying unit 202 can increase the volume of a reflected sound from the left side (or the right side) if the distribution of the region of overlap between the object 303 and the three-dimensional spatial body 302 containing the listening point 301 is biased towards the left side (or the right side), and increase the volume of a reflected sound from the front (or the back) if biased towards the front (or the back).

Since the region distribution acquired by the calculating unit 201 is expressed in three dimensions, it is also possible to increase the volume of a reflected sound from above (or below) if biased from above (or below) the listening point 301. Further, irrespective of simple relations of front and back, left and right, or above and below as seen from the listening point 301, it is possible to acquire a three-dimensionally arbitrary localization, such as for example, "a direction 30° diagonally up from the front left from the listening point."

For example, the modifying unit 202 acquires barycentric coordinates for the group of unit figures in which the object 303 is deemed to be present, and acquires the localization based on the orientation of the vector joining the barycentric coordinates and the coordinates of the listening point 301. However, methods for acquiring the localization are not limited to this, and other methods may be used.

The modifying unit 202 can cause time lag before a reflected sound is played based on the region distribution in which the object 303 is present and the position of the listening point 301. For example, the modifying unit 202 acquires the barycentric coordinates as described above, acquires the distance based on the barycentric coordinates and the coordinates of the listening point 301, and determines the elapsed time while the reflected sound arrives at the listening point 301 (in other words, the time for initiating playback of the reflected sound).

Thus, the voice processor 200 can modify volume, localization, and time difference, etc., based on the region distribution or volume value acquired by the calculating unit 201, simply and without performing complex calculations.

Figure 6A:
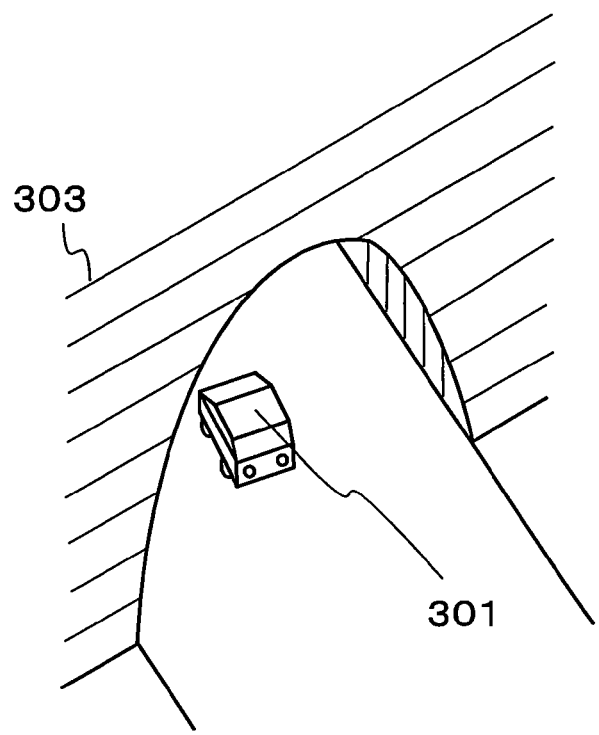
FIG. 6A An explanatory diagram showing an example arrangement in which objects are distributed in three directions from a listening point.
Figure 6B:
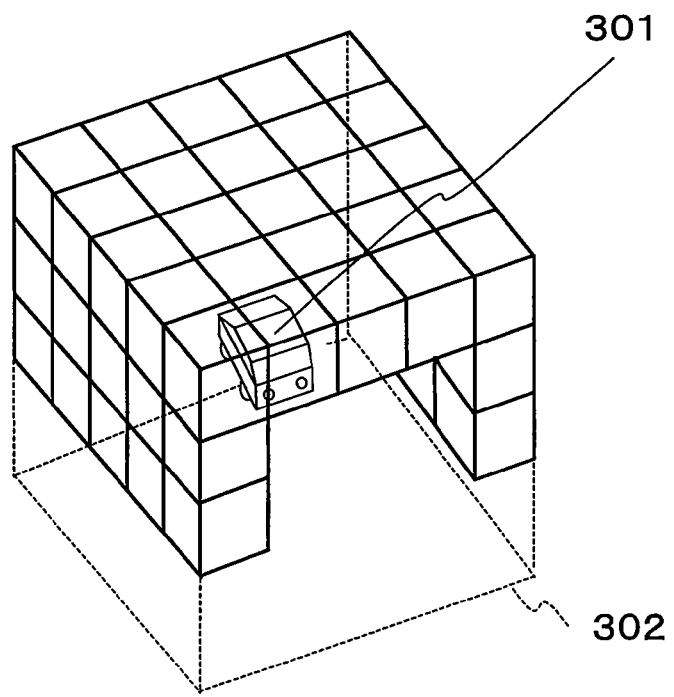
FIG. 6B An explanatory diagram showing an example of a distribution of a region of overlap.

Further, the modifying unit 202 can apply an effect for causing a reflected sound to reverberate (apply an echo) based on the region distribution acquired by the calculating unit 201. For example, when a vehicle object operated by the user in a car racing game enters the object 303 in FIG. 6A (a tunnel), the region distribution acquired by the calculating unit 201 is a distribution surrounding the listening point 301 as shown in FIG. 6B.

On the other hand, in actual sound effects, the sound of the vehicle engine generates a first reflected sound reflected from one part of the tunnel wall and the first reflected sound further generates a second reflected sound reflected from another part of the wall. As the reflected sounds are repeatedly reflected in this manner, the result is the reflected sounds reverberating, in which the time from the first reflected sound lags and the second reflected sound, whose volume has attenuated, continues. In order to calculate this effect accurately, a process must be performed for acquiring a reflected sound from one virtual piece, into which the tunnel walls are logically divided, based on the distance between the sound source and the one virtual piece, the traveling speed of the listening point 301, the traveling speed of the sound source, and so on, acquiring the reflected sounds for all the virtual pieces by integrating them, and then composing all the reflected sounds thus obtained.

However, according to the present embodiment, the reflected sound can be modified without performing this kind of exact and complex calculation. Specifically, the modifying unit 202 acquires parameters indicating volume, localization, degree of reverberation effect performed on the sound data, etc., based on the region distribution and volume value acquired by the calculating unit 201, and inputs the parameters indicating degree of reverberation effect, volume, localization, and so on into the outputting unit 203.

Figure 7:
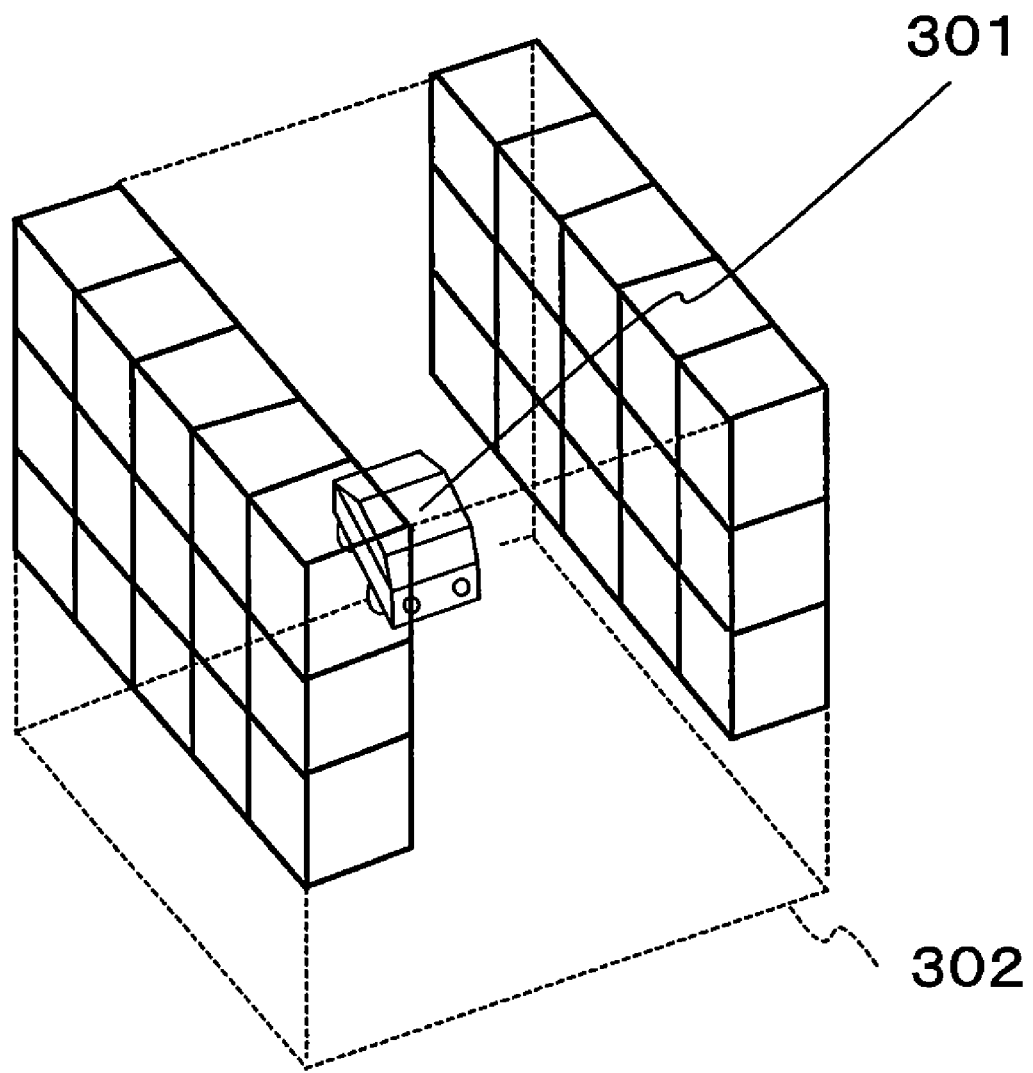
FIG. 7 An explanatory diagram showing an example arrangement in which objects are distributed at one side and an opposite side of a listening point.

For example, the modifying unit 202 causes no reverberation effect when the region distribution acquired by the calculating unit 201 is only distributed on one side of the surface of the three-dimensional spatial body 302 containing the listening point 301, and causes a predetermined amount of reverberation effect when this is distributed on one side as well as on the opposite side, as in FIG. 7. For example, the reflected sound is generated at a predetermined volume at a time T1. Then the reflected sound is generated at a volume attenuated from the original volume after a predetermined time has lapsed. By repeating this, the result is application of an effect in which the reflected sound reverberates. It is further possible to cause an even larger reverberation effect when there is a distribution in three directions, including the top, as in FIG. 6B.

In this way, the voice processor 200 can apply an effect for causing a reflected sound to reverberate (apply an echo) in this way based on the region distribution acquired by the calculating unit 201, simply and without performing exact and complex calculations. Furthermore, it is possible to modify the size of this reverberation of effect based on the size of the amount of overlap $V_{OBJ}$ acquired by the calculating unit 201.

Figure 8A:
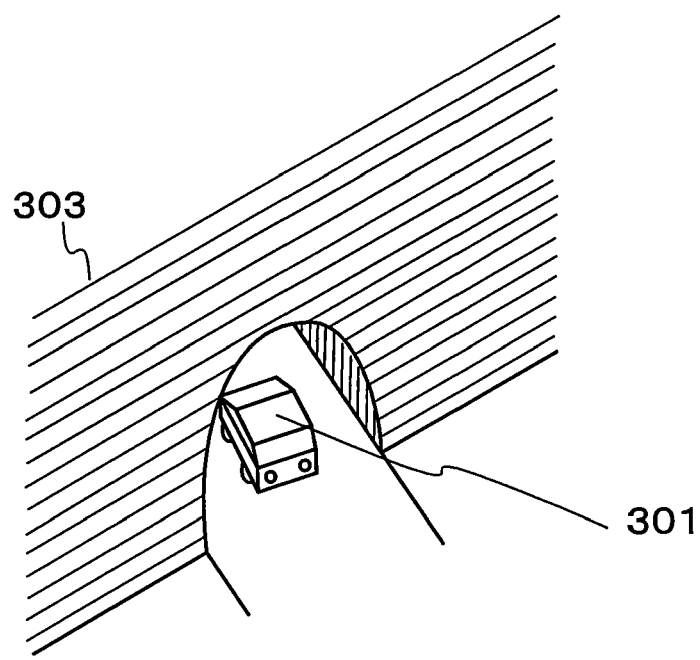
FIG. 8A An explanatory diagram showing an example arrangement in which objects are distributed in three directions from a listening point.

Further, the modifying unit 202 can apply an effect for attenuating specific frequency components of a reflected sound (muffle the sound) based on the region distribution acquired by the calculating unit 201. For example, when the listening point 301 (a vehicle object operated by the user) enters the object 303 in FIG. 6A (a tunnel), the modifying unit 202 can acquire the amount of overlap $V_{OBJ}$ with the region distribution acquired by the calculating unit 201 as in FIG. 6B and can cause specific frequency components (for example, high-frequency components) of the reflected sound to attenuate, and when entering the object 303 in FIG. 8A (a narrower tunnel), can acquire the amount of overlap $V_{OBJ}$ with the region distribution as in FIG. 8B and cause an even greater attenuation effect.

Figure 8B:
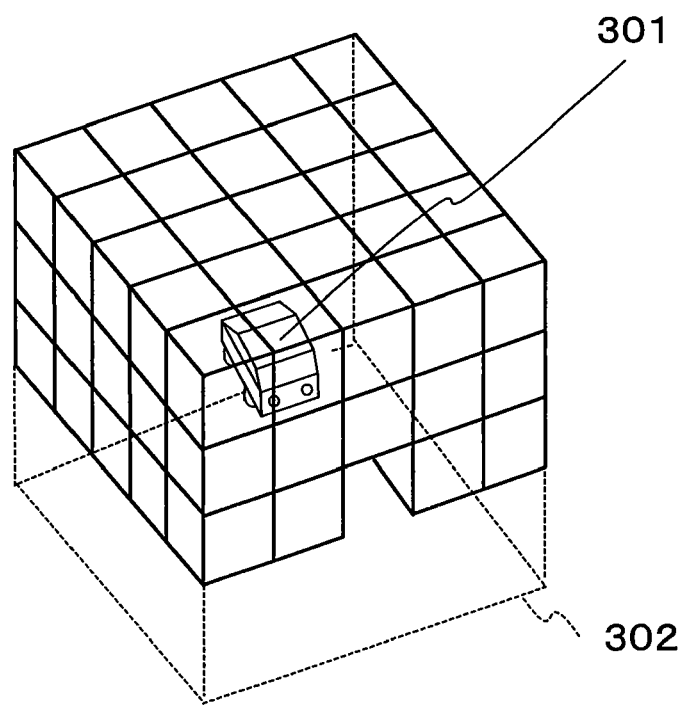
FIG. 8B An explanatory diagram showing an example of a distribution of a region of overlap.

In this way, the voice processor 200 can apply an effect to muffle a sound based on the region distribution and volume value acquired by the calculating unit 201 as in FIG. 6B and FIG. 8B, without performing exacting and complex calculations. Moreover, it is possible to modify the size of this effect based on the volume value or region distribution acquired by the calculating unit 201.

Furthermore, the sound processing of a reflected sound performed by the modifying unit 202 is not limited to that described above, but may be constituted so as to perform other effects. For example, it is possible to constitute it so as to perform an effect of modifying the frequency or pitch, etc., of the reflected sound based on the traveling speed of the listening point 301 or the object 303.

The outputting unit 203 outputs a sound heard at the listening point 301 within the virtual space based on a reflected sound modified by the modifying unit 202. Namely, the outputting unit 203 acquires information for modifying the reflected sound from the modifying unit 202, and acquires sound data of a reflected sound to be played which is recorded in advance in an information recording medium such as a DVD-ROM, etc., loaded onto the DVD-ROM drive 108. The outputting unit 203 modifies and then outputs the sound data of the reflected sound to be played. The modified reflected sound is output by speakers, etc., connected to the sound processing unit 110. As a result, the user can hear game sounds including reflected sounds.

Moreover, the CPU 101 and the sound processing unit 110 work in cooperation to function as the outputting unit 203.

Figure 9A:
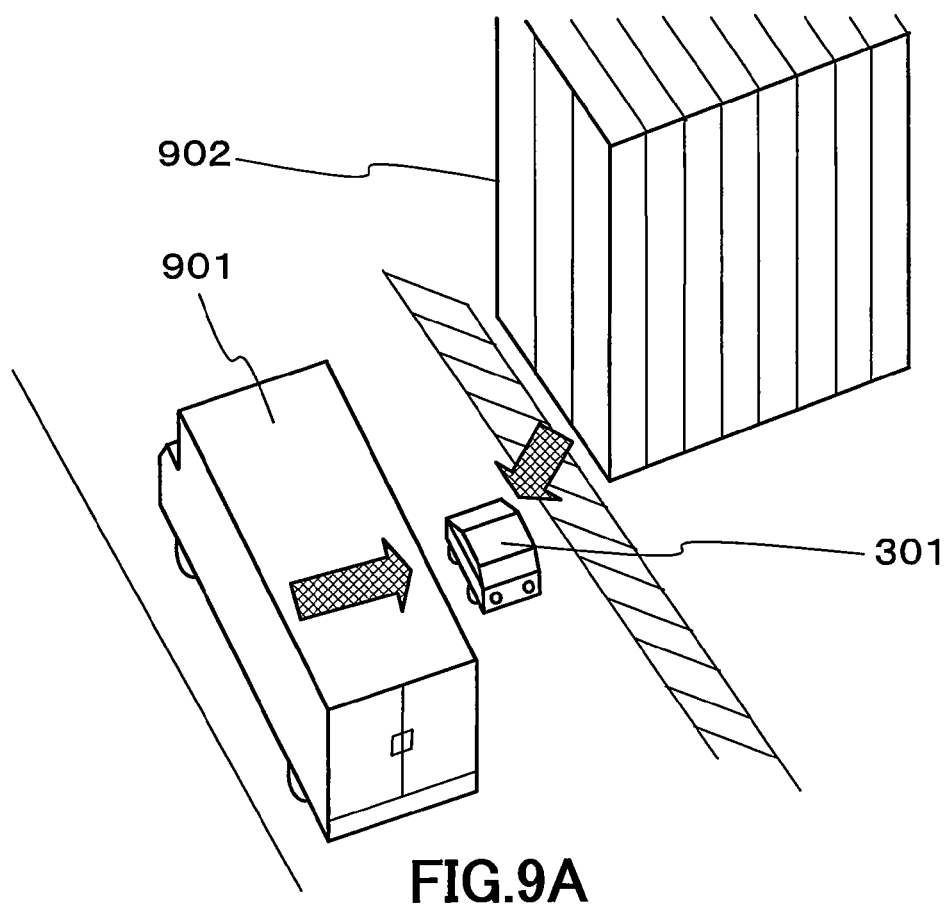
FIG. 9A An explanatory diagram showing an arrangement example of a listening point and objects within a virtual space.
Figure 9B:
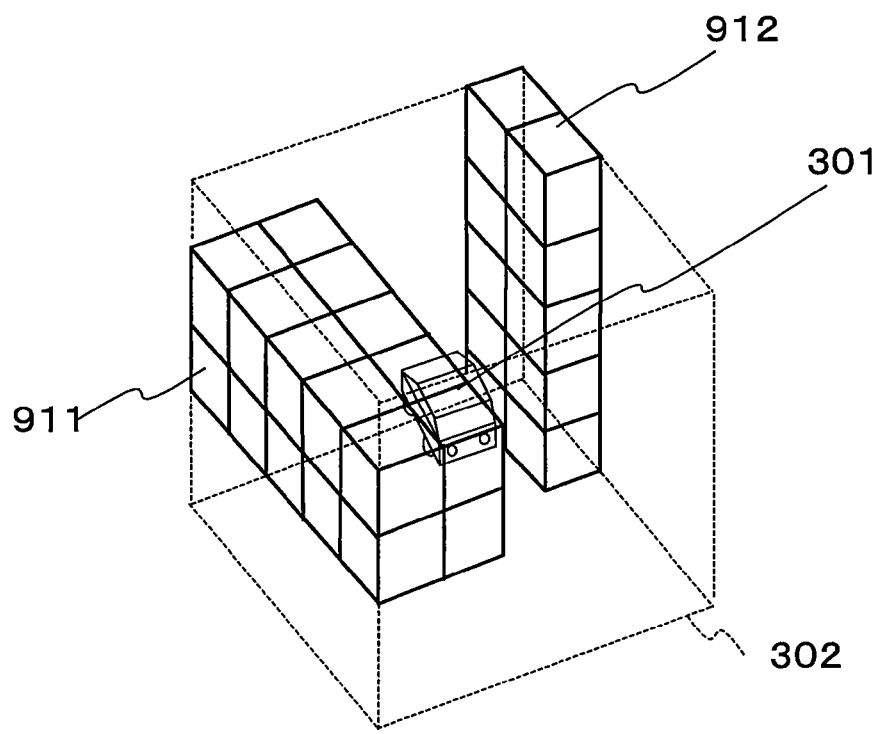
FIG. 9B An explanatory diagram showing an example of a distribution of a region of overlap.

For example, a scene such as that in FIG. 9A in a car racing game within the virtual space is assumed. In this example, the listening point 301 is the driver's seat in the vehicle object operated by the user. There exist objects 303, such as a vehicle object 901 driving alongside the listening point 301, and a building object 902 near the course. Sounds heard at the listening point 301 include, for example, the engine sound of the vehicle operated by the user, the sounds reflected by the objects 303 (the vehicle object 901 driving alongside, the nearby building object 902, etc.) from this engine sound, and sounds generated by the objects 303, etc. The sounds reflected by the objects 303 are reflected sounds modified by the modifying unit 202 as described above. Taking into consideration the three-dimensional spatial body 302 containing the listening point 301, a region distribution 911 where there is the vehicle object 901 that is one of the objects 303, and a region distribution 912 where there is the nearby building object 902 that is one of the objects 303, are illustrated in FIG. 9B for example. In this case, the first reflected sound by the vehicle object 901 driving alongside is a reflected sound modified by the modifying unit 202 based on the region distribution 911 and the volume value "20 (the units are arbitrary)" in FIG. 9B. Further, the second reflected sound by the nearby building object 902 is a reflected sound modified by the modifying unit 202 based on the region distribution 912 and the volume value "10 (the units are arbitrary)" in FIG. 9B. The outputting unit 203 outputs a sound including the first and the second reflected sounds.

For example, in the situation in this drawing, the outputting unit 203 can set, and then output, the volume of the first reflected sound by the vehicle object 901 driving alongside as twice the volume of the second reflected sound by the building object 902. The outputting unit 203 can set different localizations for the first and the second reflected sounds and output the reflected sounds. Further, the outputting unit 203 can apply an effect of causing the reflected sounds to reverberate or an effect of muffling the reflected sounds, due to the listening point 301 being sandwiched between two objects 303.

Figure 10:
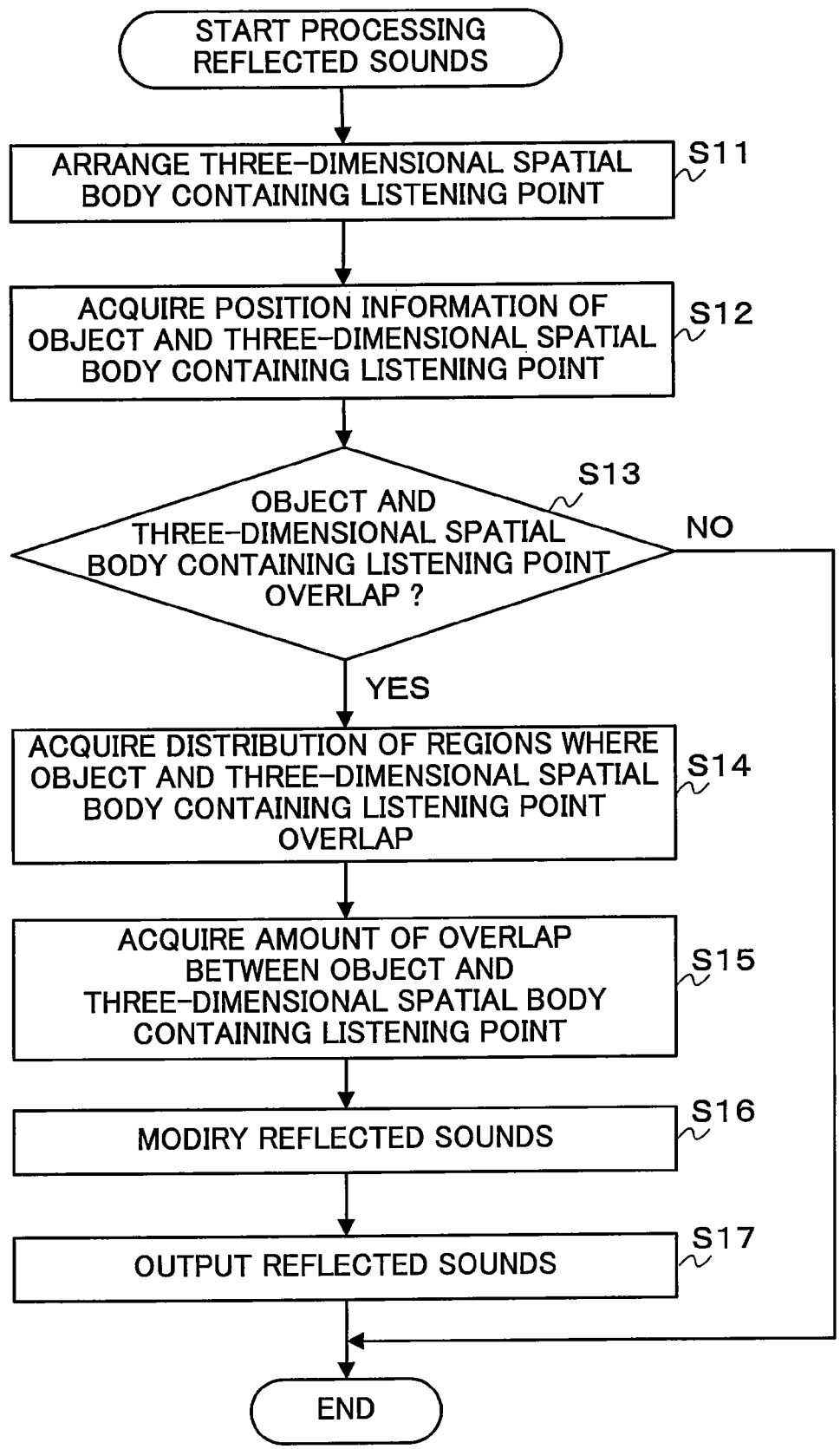
FIG. 10 A flowchart showing the flow of describing sound processing of a reflected sound.

Next, sound processing of a reflected sound performed by the voice processor 200 according to the present embodiment is described using the flowchart in FIG. 10.

First, the voice processor 200 arranges the listening point 301 and the objects 303 within the virtual space. For example, the CPU 101 reads and executes a predetermined game program read from a DVD-ROM, etc., loaded onto the DVD-ROM drive 108. The CPU 101 works in cooperation with the image processor 107 to calculate the coordinates of the listening point 301 and the objects 303 and arranges these within the virtual space, then generates a virtual image in the visual axis direction from an arbitrary viewing point. The virtual image thus generated is displayed on a monitor, etc., connected to the image processor 107.

Next, the calculating unit 201 arranges the three-dimensional spatial body 302 so as to surround the listening point 301 within the virtual space (step S11). The shape and size of the three-dimensional spatial body 302 as well as the unit figures constituting the three-dimensional spatial body 302 are defined ahead of time by the game program. Alternately, they may also be variable depending on the game scene.

The calculating unit 201 acquires position information of the object 303 and the three-dimensional spatial body 302 containing the listening point 301 (step S12). For example, the position information represents coordinates of the listening point 301, the three-dimensional spatial body 302, and the object 303 within the three-dimensional virtual space.

The calculating unit 201 determines whether or not there exists a region in which the object and the three-dimensional spatial body 302 containing the listening point 301 overlap, based on the acquired position information (step S13).

If there is no region in which the object and the three-dimensional spatial body 302 containing the listening point 301 overlap (step S13; NO), the voice processor 200 terminates sound processing of a reflected sound. In other words, the voice processor 200 does not play sounds reflected from the object 303.

On the other hand, if there is a region of overlap (step S13; YES), the calculating unit 201 acquires the distribution of the region of overlap (step S14).

For example, as shown in FIG. 9A, in a car racing game within the virtual space, the object 303 and the listening point 301 of the vehicle object operated by the user are arranged within the virtual space, and a reflected sound is obtained at the listening point 301 from the object 303 of the vehicle object operated by the user. The calculating unit 201 uses the aforementioned method to acquire the region distribution in which are present the vehicle object 901 driving alongside the vehicle object operated by the user. Similarly, the calculating unit 201 uses the aforementioned method to acquire the region distribution in which is present the building object 902 near the listening point 301. As a result, the calculating unit 201 obtains the region distribution in which the objects 303 are present as in FIG. 9B.

The calculating unit 201 acquires the amount of overlap $V_{OBJ}$ using the aforementioned method from the distribution of the region of overlap thus acquired between the objects 303 and the three-dimensional spatial body 302 containing the listening point 301 (step S15).

For example, as in FIG. 9B, the calculating unit 201 obtains a volume value "20" as the amount of overlap $V_{OBJ}$ between the object 303 (vehicle object 901) and the three-dimensional spatial body 302 containing the listening point 301. Similarly, the calculating unit 201 obtains a volume value "10" as the amount of overlap $V_{OBJ}$ between the object 303 (building object 902) and the three-dimensional spatial body 302 containing the listening point 301.

Further, the calculating unit 201 may be constituted so as to acquire the distribution of the region of overlap and the amount of overlap $V_{OBJ}$, irrespective of whether or not a region of overlap between the object 303 and the three-dimensional spatial body 302 containing the listening point 301 is present.

Next, the modifying unit 202 modifies the sound reflected by the object 303 based on the distribution of the region of overlap and the amount of overlap $V_{OBJ}$ acquired by the calculating unit 201 (step S16).

For example, the larger the volume value of the region of overlap is, the more the volume of the reflected sound can be increased by the modifying unit 202. Further, for example, the modifying unit 202 modifies the localization of the reflected sound depending on the distribution of the region of overlap.

For example, the closer the distribution of the region of overlap is to the distribution present on both sides sandwiching the listening point 301 as in FIG. 7, the larger the degree (for example, the duration, etc.) of reverberation (echo) of the reflected sound can be increased by the modifying unit 202.

For example, the narrower the area surrounding the listening point 301 by the object 303 is, the larger the degree of attenuating certain frequency components in the reflected sound (muffling the sound) can be increased by the modifying unit 202, as shown in FIG. 8B.

The outputting unit 203 outputs the reflected sound thus modified by the modifying unit 202 (step S17). In other words, the outputting unit 203 uses the information indicating the modification of the reflected sound modified in step S16 and sound data for playback to output a reflected sound modified by the objects 303, as well as other sounds, sound effects, and background music, etc., emitted by characters, etc., in the game.

Moreover, sound processing of the reflected sound is desirably performed as an interrupting process at a predetermined timing (for example, the vertical synch timing when displaying an image on a monitor connected to the image processor 107).

Thus, the voice processor 200 can modify volume, localization, and time difference, etc., of a reflected sound based on the region distribution or volume value acquired by the calculating unit 201, simply and without performing exacting and complex calculations. It is also possible to apply an echo and muffle to the reflected sound. As a result, a stereophonic effect can be obtained within the virtual space.

Embodiment 2

Next follows a description of another embodiment of the present invention. With the present embodiment, the calculating unit 201 acquires a surface area value instead of a volume value as the amount of overlap $V_{OBJ}$ between the object 303 and the three-dimensional spatial body 302 containing the listening point 301. Note that since the constitution of the voice processor 200 according to the present embodiment is otherwise the same as the embodiment described above, description thereof is omitted.

The calculating unit 201 acquires as the amount of overlap $V_{OBJ}$ between the three-dimensional spatial body 302 and the object 303 a surface area value of the area in which both overlap. Since the shape of the object 303 is arbitrary here, there are cases in which the amount of calculation for accurately acquiring the surface area value of the area of overlap is tremendous. In the present embodiment, the calculating unit 201 determines whether or not an area of overlap with the object 303 exists for each unit figure constituting the surface of the three-dimensional spatial body 302, and if an area of overlap exists, it deems that those unit figures are a part of the area of overlap. This determination is made for all the unit figures, and the amount of overlap $V_{OBJ}$ is made the total value of the surface area values of the unit figures deemed to be part of the area of overlap.

Moreover, it is also possible to deem certain unit figures to be a part of the amount of overlap $V_{OBJ}$ if the area of overlap among those certain unit figures is greater than or equal to a predetermined ratio (for example, 50%).

Also, instead of a surface area value, it is also possible to acquire a ratio of a number N of unit figures in which is present an area of overlap with the object 303 to a total number $N_{UNIT}$ of the unit figures constituting the surface of the three-dimensional spatial body 302 containing the listening point 301 as in Formula 4, and make the amount of overlap $V_{OBJ}$ the size of this ratio.

Figure 11A:
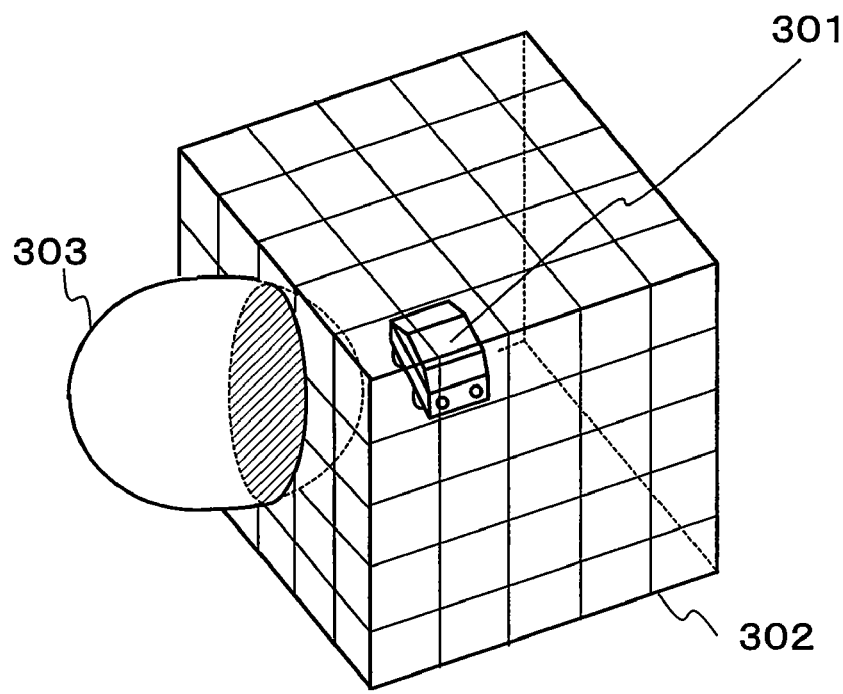
FIG. 11A An explanatory diagram showing an example arrangement in which an object and a three-dimensional spatial body containing a listening point overlap.
Figure 11B:
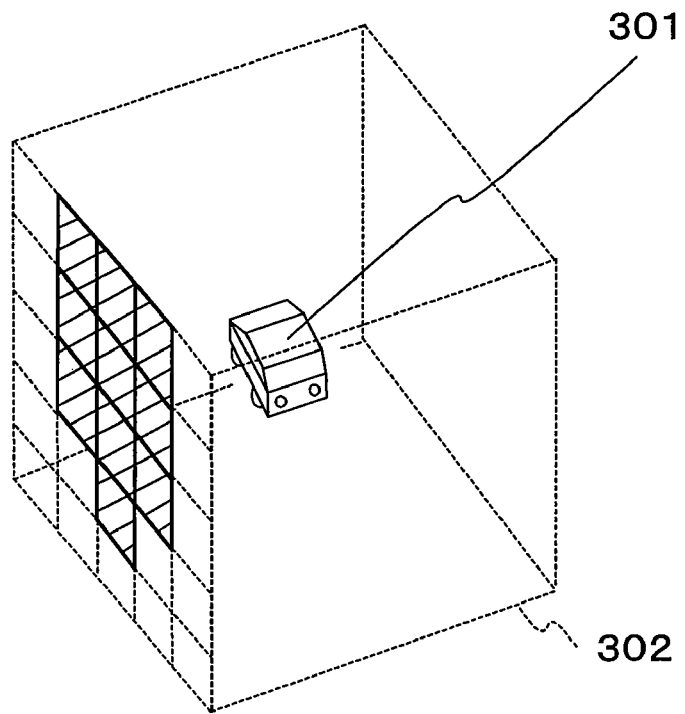
FIG. 11B An explanatory diagram showing an example of a distribution of a region of overlap.

For example, the three-dimensional spatial body 302 is a rectangular solid, each surface is constituted by 5×5=25 unit figures, and a region of overlap between the object 303 and the three-dimensional spatial body 302 is present as in FIG. 11A. At this time, the calculating unit 201 uses any of the above methods to determine whether or not the object 303 is present in the unit figures, and deems that 10 unit figures distributed as shown, for example, in FIG. 11B, are the region of overlap between the three-dimensional spatial body 302 and the object 303. The calculating unit 201 then obtains a volume value of "10 (the units are arbitrary)" as the amount of overlap $V_{OBJ}$ between the three-dimensional spatial body 302 and the object 303.

The modifying unit 202 then modifies the reflected sound based on the amount of overlap $V_{OBJ}$ between the object 303 and the three-dimensional spatial body 302 acquired by the calculating unit 201 as in the previous embodiment.

Thus, as in the embodiment mentioned above, the voice processor 200 can modify volume, localization, and time difference, etc., of a reflected sound based on the region distribution or surface area value acquired by the calculating unit 201, simply and without performing exact and complex calculations. It is also possible to apply an echo and muffle to the reflected sound. As a result, a stereophonic effect can be obtained within the virtual space. Further, the voice processor 200 can obtain stereophonic effects even more simply than when using a volume value by using a surface area value as the amount of overlap $V_{OBJ}$.

Embodiment 3

Figure 12A:
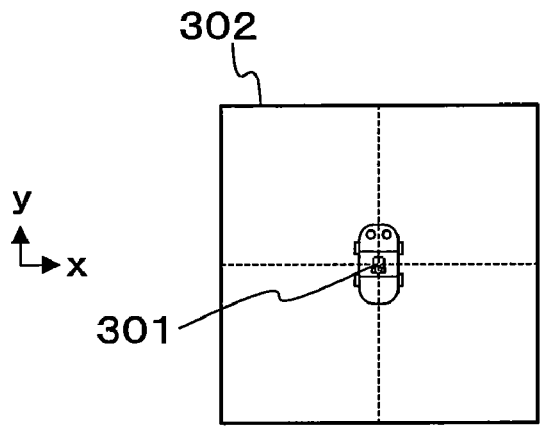
FIG. 12A An example of an arrangement diagram of a listening point and a three-dimensional spatial body.
Figure 12B:
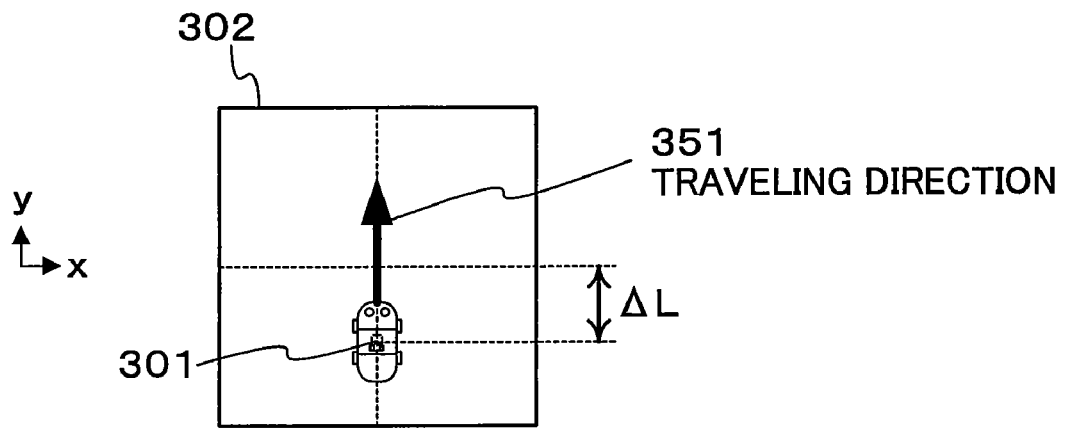
FIG. 12B An example of an arrangement diagram in which a center position of a three-dimensional spatial body travels in a direction of travel of a listening point.
Figure 12C:
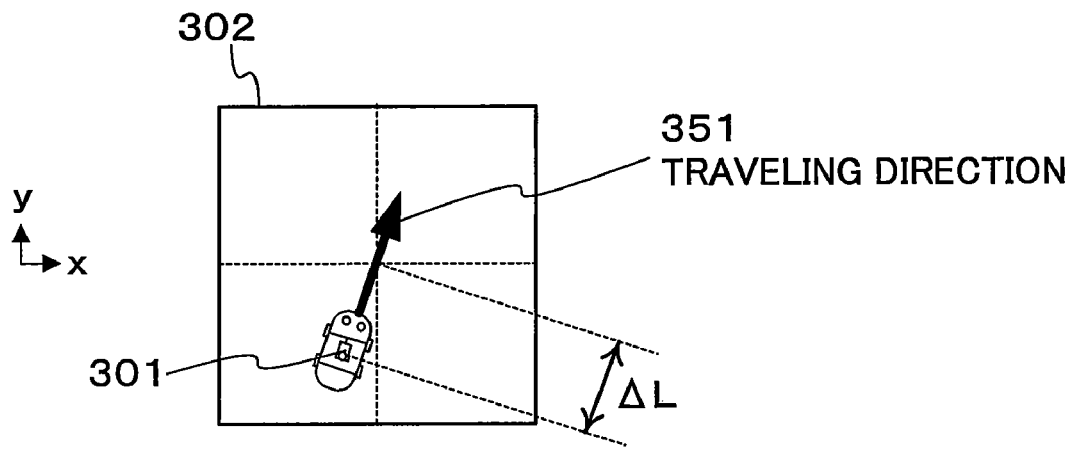
FIG. 12C An example of an arrangement diagram in which a center position of a three-dimensional spatial body travels in a direction of travel of a listening point.

Next, another embodiment of the present invention is described using FIGS. 12A, 12B, and 12C. With the present embodiment, the calculating unit 201 arranges the three-dimensional spatial body 302 within the virtual space based on the traveling speed of the listening point 301.

As in the above embodiment, the calculating unit 201 arranges the three-dimensional spatial body 302 containing the listening point 301 within the virtual space. In the present embodiment, the calculating unit 201 acquires the traveling speed of the listening point 301 and changes the center position of the three-dimensional spatial body 302 based on this traveling speed. For example, the calculating unit 201 arranges the center position of the three-dimensional spatial body 302 by moving it by a predetermined amount ΔL in the direction of travel of the listening point 301. Specifically, the calculating unit 201 increases the predetermined amount ΔL the larger the traveling speed. For example, the predetermined amount ΔL is increased in proportion to the traveling speed. Alternately, for example, the predetermined amount ΔL is changed using a stepwise function in which the predetermined amount ΔL and the traveling speed are associated in such a way that the predetermined amount ΔL increases in a stepwise manner as the traveling speed grows. However, methods for determining the size of the predetermined amount ΔL are not limited to these.

For example, FIGS. 12A, 12B, and 12C are arrangement diagrams of the three-dimensional spatial body 302 seen from directly above (the Z direction) the listening point 301. If the traveling speed of the listening point 301 is zero, the listening point 301 and the center position of the three-dimensional spatial body 302 match, as in FIG. 12A. On the other hand, if the traveling speed of the listening point 301 is not zero, then, as in FIG. 12B and FIG. 12C, the center position of the three-dimensional spatial body 302 moves by the predetermined amount ΔL in a traveling direction 351 of the listening point 301. Thus, the change of the reflected sounds from the direction of movement are emphasized compared to other directions, since the center position of the three-dimensional spatial body 302 travels in the traveling direction 351 of the listening point 301.

As in the above embodiments, the calculating unit 201 then acquires the amount of overlap $V_{OBJ}$ between the three-dimensional spatial body 302 and the object 303 (for example, volume value or surface area value), and inputs thus acquired amount $V_{OBJ}$ into the modifying unit 202. Alternately, the calculating unit 201 acquires a distribution of a region of overlap between the object 303 and the three-dimensional spatial body 302, and inputs data indicating the acquired region distribution into the modifying unit 202.

The modifying unit 202 modifies the reflected sounds based on the distribution of regions of overlap and the amount of overlap $V_{OBJ}$ acquired by the calculating unit 201. Note that since the overview constitution of the voice processor 200 is otherwise the same as the above embodiments, description thereof is omitted.

In this way, the voice processor 200 can apply an effect of emphasizing the modification of sounds reflected from the traveling direction 351 in which the listening point 301 travels. For example, the voice processor 200 can increase the volume and/or move the localization of sounds reflected from the traveling direction 351 in which the listening point 301 travels without performing exacting and complex calculations. It is possible to change the degree with which the reflected sounds are caused to reverberate or with which other sound effects are applied, based on the direction in which the listening point 301 travels.

Embodiment 4

Figure 13A:
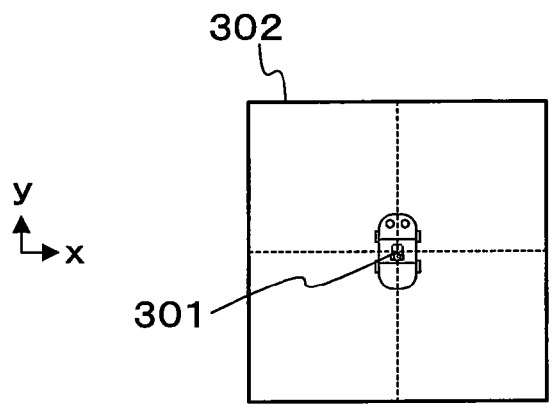
FIG. 13A An example of an arrangement diagram of a listening point and a three-dimensional spatial body.
Figure 13B:
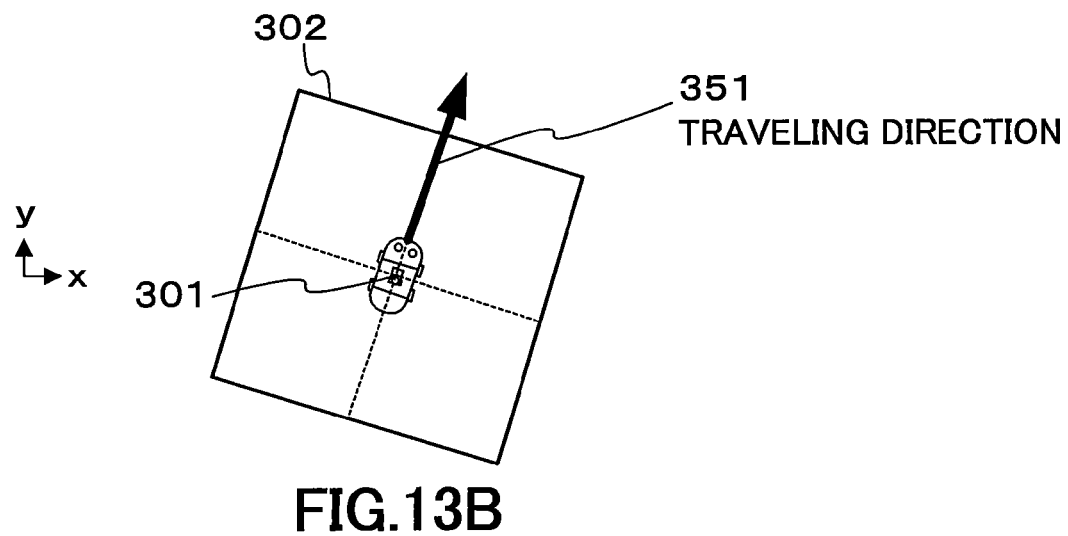
FIG. 13B An example of an arrangement diagram in which a reference direction of a three-dimensional spatial body is changed to a direction of travel of a listening point.
Figure 13C:
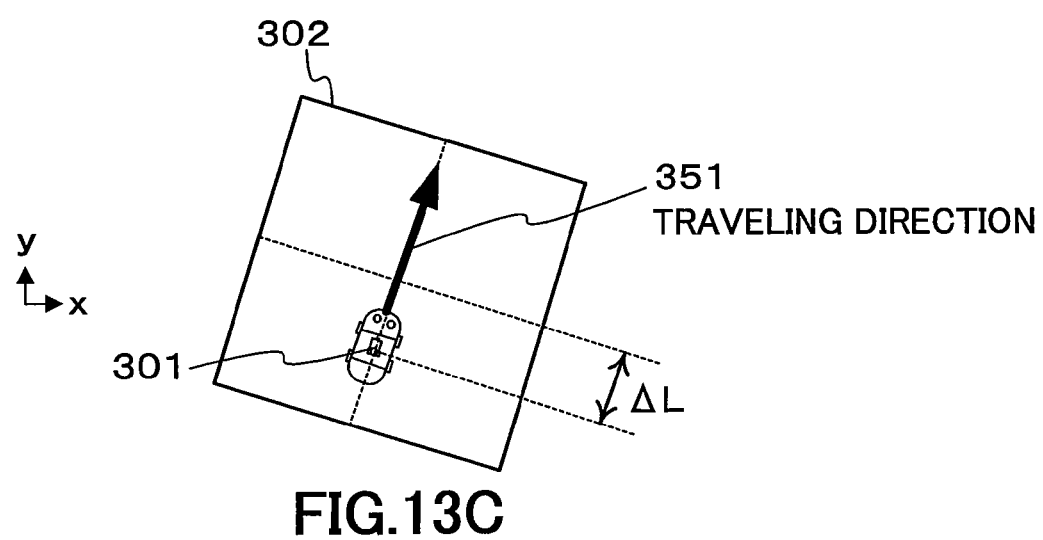
FIG. 13C An example of an arrangement diagram in which a reference direction of a three-dimensional spatial body is changed to a direction of travel of a listening point.

Next, another embodiment of the present invention is described using FIGS. 13A, 13B, and 13C.

As in the above embodiment, the calculating unit 201 arranges the three-dimensional spatial body 302 containing the listening point 301 in the virtual space. In the present embodiment, the calculating unit 201 acquires the traveling speed of the listening point 301 and changes the reference direction (X, Y, and Z directions) of the three-dimensional spatial body 302 based on this traveling speed. For example, if the shape of the three-dimensional spatial body 302 is a rectangular solid, the calculating unit 201 sets one of the three sides crossing of the three-dimensional spatial body 302 in the traveling direction 351 of the listening point 301, sets another side in a direction vertical and horizontal to the traveling direction 351, sets another side in a direction vertical to these two sides, and thus disposes the three-dimensional spatial body 302.

For example, FIGS. 13A, 13B, and 13C are arrangement diagrams of the three-dimensional spatial body 302 seen from directly above (the z direction) the listening point 301. If the traveling speed of the listening point 301 is zero, the orientation of the three-dimensional spatial body 302 within the virtual space matches the axial directions of the global coordinate (world coordinate) system of the virtual space, as shown in FIG. 13A. On the other hand, if the traveling speed of the listening point 301 is not zero, the three-dimensional spatial body 302 is arranged according to the orientation of travel as shown in FIG. 13B.

The modifying unit 202 then modifies the reflected sounds based on the distribution of regions of overlap and the amount of overlap $V_{OBJ}$ acquired by the calculating unit 201. Note that since the overview constitution of the voice processor 200 is otherwise the same as the above embodiments, description thereof is omitted.

Thus, the voice processor 200 can apply an effect of changing the degree of modification of the reflected sounds based on the traveling direction 351 of the listening point 301. For example, the voice processor 200 can modify the localization of the reflected sounds based on the direction of travel of the listening point 301.

Moreover, the calculating unit 201, as shown in FIG. 13C, can change the reference direction of the three-dimensional spatial body 302 based on the orientation in which the listening point 301 is traveling, and also move the center position of the three-dimensional spatial body 302 by the predetermined amount ΔL in the traveling orientation. More realistic sound effects can thus be obtained, as the change of the reflected sounds in the direction of travel of the listening point 301 can be emphasized and the localization can be determined based on the direction of travel. Moreover, also in this case, as in the above embodiments, the larger the traveling speed is, the larger the predetermined amount ΔL in the orientation of the traveling speed can be increased by the calculating unit 201, but this is not a limitation.

Embodiment 5

Figure 14:
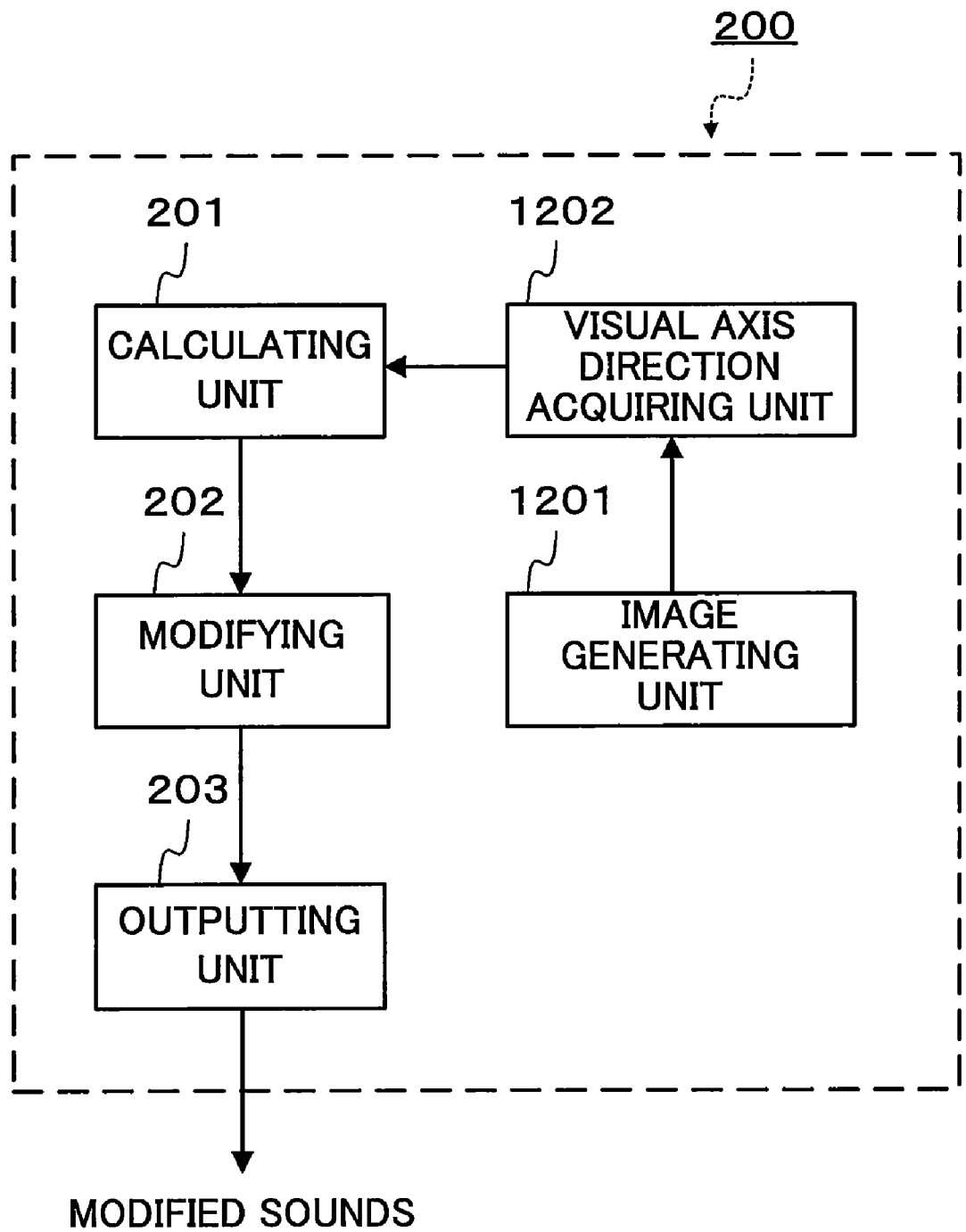
FIG. 14 An explanatory diagram describing a process performed by a voice processor.

Next, another embodiment of the present invention is described using FIG. 14. With the present embodiment, the voice processor 200 further comprises an image generating unit 1201 for generating virtual images in which the objects 303 arranged within the virtual space are seen from the listening point 301 within the virtual space, and a visual axis direction acquiring unit 1202 for acquiring a visual axis direction 352 in which the objects 303 arranged within the virtual space are seen from the listening point 301. The calculating unit 201 arranges the three-dimensional spatial body 302 based on the visual axis direction of the virtual image acquired by the visual axis direction acquiring unit 1202. Note that since the constitution of the voice processor 200 is otherwise the same as the above embodiments, description thereof is omitted.

The image generating unit 1201 generates virtual images in which the objects 303 arranged within the virtual space are seen with the listening point 301 as a viewing point. For example, when the game program is executed by the CPU 101, the image generating unit 1201 moves the viewing point according to the game scene or input instructions from the user, and generates and outputs a virtual image seen in the visual axis direction from that viewing point. The virtual image thus generated is displayed on a monitor, etc., connected to the image processor 107.

Moreover, the CPU 101 and the image processor 107 work in cooperation to function as the image processor 1201.

The visual axis direction acquiring unit 1202 acquires from the image generating unit 1201 the visual axis direction 352 of the virtual image with the listening point 301 within the virtual space as the viewing point and inputs thus acquired data indicating the visual axis direction 352 to the calculating unit 201. For example, the visual axis direction acquiring unit 1202 acquires the visual axis direction vector based on predetermined position information of the listening point 301 and position information of an object 303 included in the image generated by the image generating unit 1201, and makes the orientation of this vector the visual axis direction. Alternately, the visual axis direction acquiring unit 1202 may also be constituted so as to acquire the visual axis direction 352 of the virtual image based on input from another information processing device mutually connected to a computer communications network via the NIC 109.

Moreover, the CPU 101 and the image processor 107 work in cooperation to function as the visual axis direction acquiring unit 1202.

The calculating unit 201 arranges the three-dimensional spatial body 302 by moving the center position of the three-dimensional spatial body 302 by the predetermined amount ΔL in the visual axis direction 352 of the virtual image based on the visual axis direction 352 of the virtual image acquired by the visual axis direction acquiring unit 1202. As in the above embodiments, the calculating unit 201 acquires the region distribution of overlap and the amount of overlap $V_{OBJ}$ between the object 303 and the three-dimensional spatial body 302 containing the listening point 301, and inputs this into the modifying unit 202. The calculating unit 201 moves the center position of the three-dimensional spatial body 302 by the predetermined amount ΔL in the visual axis direction 352. For example, the size of the predetermined amount ΔL is predetermined for each game scene (for example, for each course in a car racing game), but the method for determining the size of the predetermined amount ΔL is not limited to this.

Figure 15A:
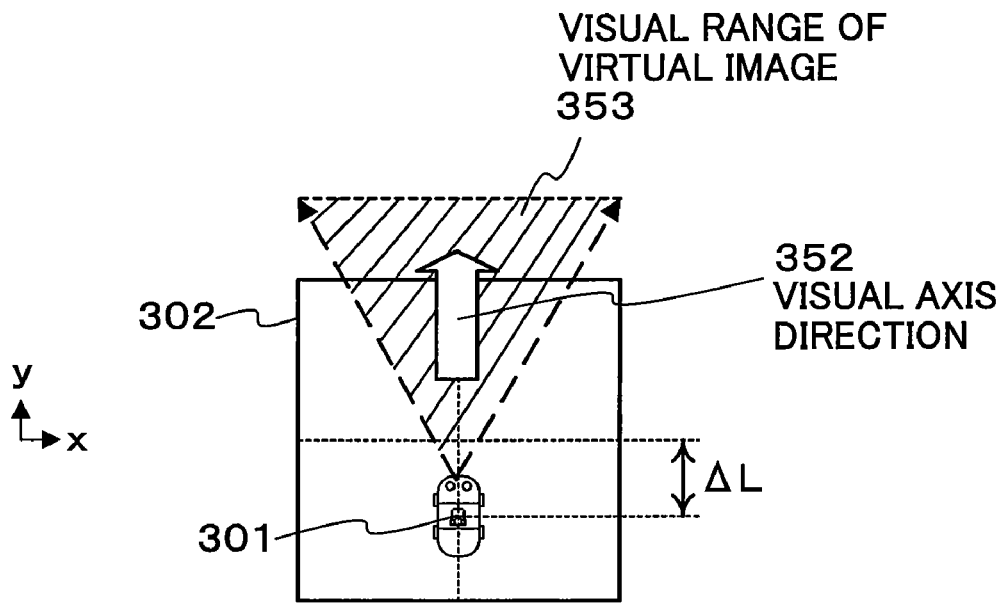
FIG. 15A An example of an arrangement diagram of a listening point and a three-dimensional spatial body.
Figure 15B:
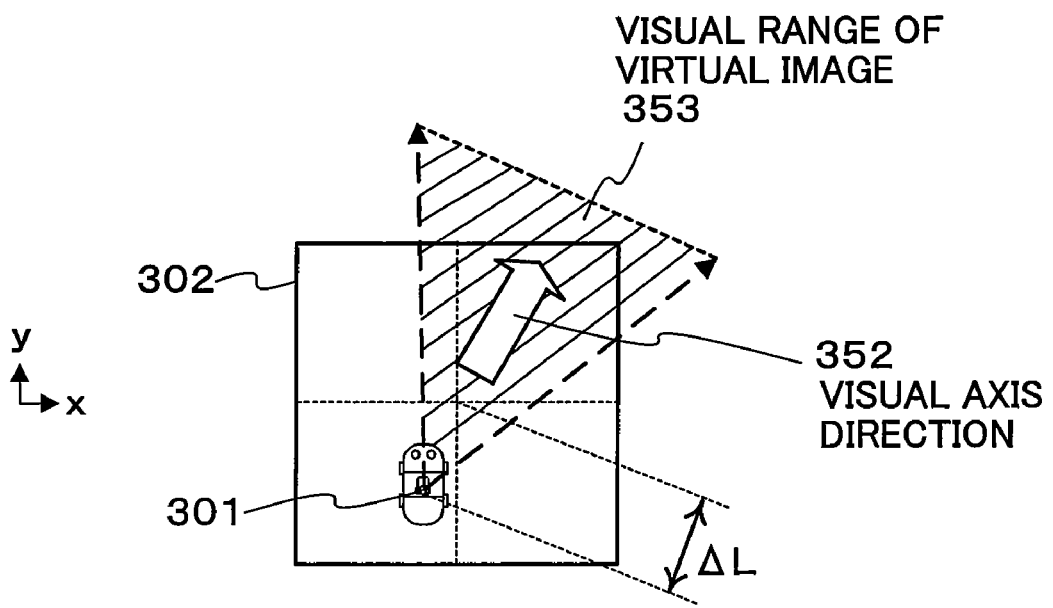
FIG. 15B An example of an arrangement diagram in which a center position of a three-dimensional spatial body is moved to a visual axis direction.

FIGS. 15A and 15B are arrangement diagrams of the three-dimensional spatial body 302 seen from directly above the listening point 301 (the z direction). For example, if the visual axis direction 352 is the y direction in the global coordinate system of the virtual space, the calculating unit 201 moves the center position of the three-dimensional spatial body 302 by the size of the predetermined amount ΔL in the Y direction, which is the visual axis direction 352, as shown in FIG. 15A. At this time, a visual range 353 of the virtual image generated by the image generating unit 1202 is the range of the cross-hatched section of the drawing. For example, if the visual axis direction moves to the X direction, the calculating unit 201 moves the center position of the three-dimensional spatial body 302 to the new visual axis direction.

The modifying unit 202 modifies the sound heard at the listening point 301 based on the region distribution of overlap and the amount of overlap $V_{OBJ}$ between the three-dimensional spatial body 302 and the object 303, taking into consideration the visual axis direction 352 of the virtual image, as in the above embodiments. The outputting unit 203 outputs the reflected sounds thus modified by the modifying unit 202.

In this way, even if the position of the listening point 301 within the virtual space is the same, the voice processor 200 can modify the localization of sounds such as reflected sounds, etc., so as to match the visual axis direction 352 if the visual axis direction 352 is different, and can thus create a greater sense of reality.

Embodiment 6

Figure 16A:
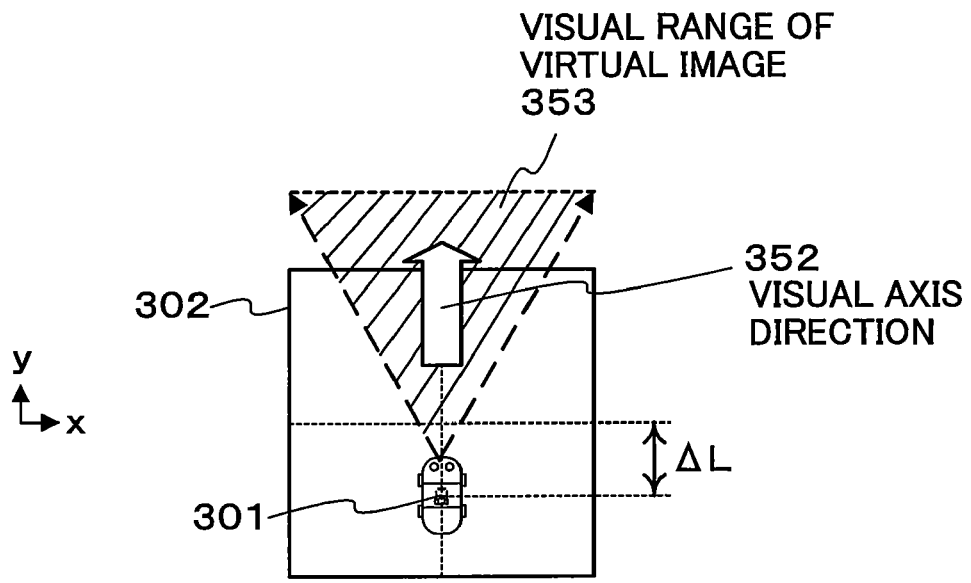
FIG. 16A An example of an arrangement diagram of a listening point and a three-dimensional spatial body.
Figure 16B:
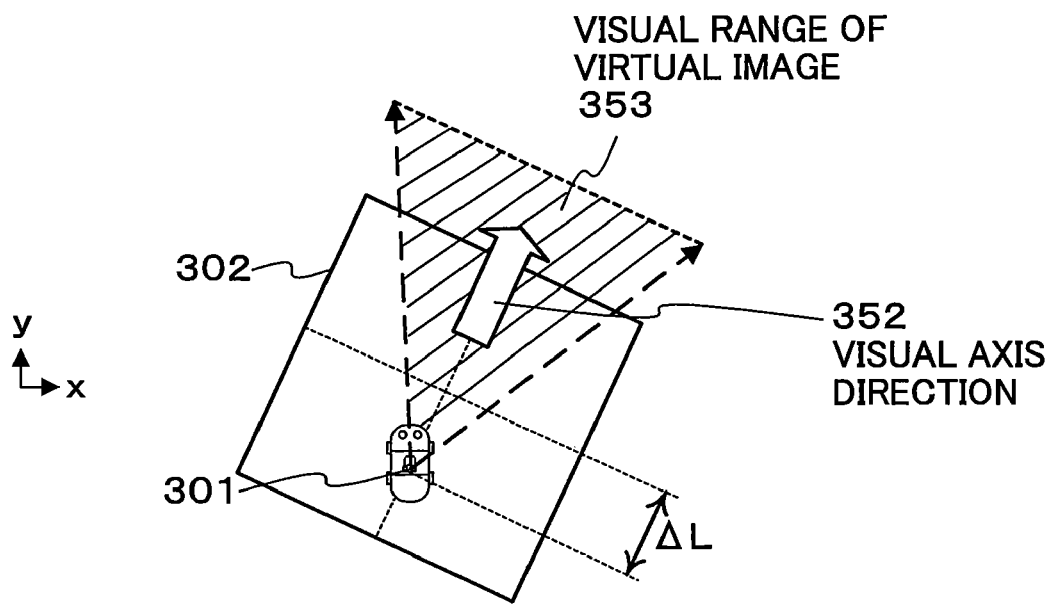
FIG. 16B An example of an arrangement diagram in which a reference direction of a three-dimensional spatial body is changed to a visual axis direction.

Next, another embodiment of the present invention is described using FIGS. 16A and 16B. The present embodiment also further comprises the image generating unit 1201 and the visual axis direction acquiring unit 1202 as shown in FIG. 14.

The calculating unit 201 arranges the three-dimensional spatial body 302 containing the listening point 301 within the virtual space based on the visual axis direction 352 of the virtual image acquired by the visual axis direction acquiring unit 1202. That is, the calculating unit 201 arranges the three-dimensional spatial body by changing the reference direction (X, Y, and Z directions) of the three-dimensional spatial body 302 based on the visual axis direction 352 of the virtual image. As in the above embodiments, the calculating unit 201 acquires the region distribution of overlap and the amount of overlap $V_{OBJ}$ between the object 303 and the three-dimensional spatial body 302 containing the listening point 301, and inputs this into the modifying unit 202.

The modifying unit 202 modifies the sound heard at the listening point 301 based on the region distribution of overlap and the amount of overlap $V_{OBJ}$ between the three-dimensional spatial body 302 and the object 303, taking into consideration the visual axis direction 352 of the virtual image, as in the above embodiments. For example, the modifying unit 202 modifies the localization of sounds reflected by the object 303. The outputting unit 203 outputs the reflected sounds thus modified by the modifying unit 202.

For example, the calculating unit 201 sets one of the three sides crossing of the three-dimensional spatial body 302 in the visual axis direction 352, sets another side of the three-dimensional spatial body 302 in a direction vertical and horizontal to the visual axis direction 352, sets another side in a direction vertical to these two sides, and thus disposes the cubic three-dimensional spatial body 302. For example, as in FIG. 16A, the three-dimensional spatial body 302 is arranged by moving the center position of the three-dimensional spatial body 302 by the size of the predetermined amount ΔL from the listening point 301. At this time, a visual range 353 of the virtual image output by the image generating unit 1202 is the range of the cross-hatched section of the drawing. For example, if the visual axis direction 352 moves, the calculating unit 201 changes the reference direction of the three-dimensional spatial body 302 according to the visual axis direction 352. The size of the predetermined amount ΔL is determined ahead of time for each game scene, but the method for determining the predetermined amount ΔL is not limited to this.

The modifying unit 202 deems the visual axis direction 352 to a forward or backward direction of the listening point 301, deems the direction vertical and horizontal to the visual axis direction 352 to a left or right direction of the listening point 301, deems the direction vertical to these front and rear directions and left and right directions to be above and below the listening point 301, and determines the localization of sound. The outputting unit 203 outputs the reflected sounds thus modified by the modifying unit 202.

In this way, even if the position of the listening point 301 within the virtual space is the same, the voice processor 200 can modify the localization of sounds such as reflected sounds so as to match the visual axis direction 352 if the visual axis direction 352 is different, and can thus create a greater sense of reality.

Figure 17A:
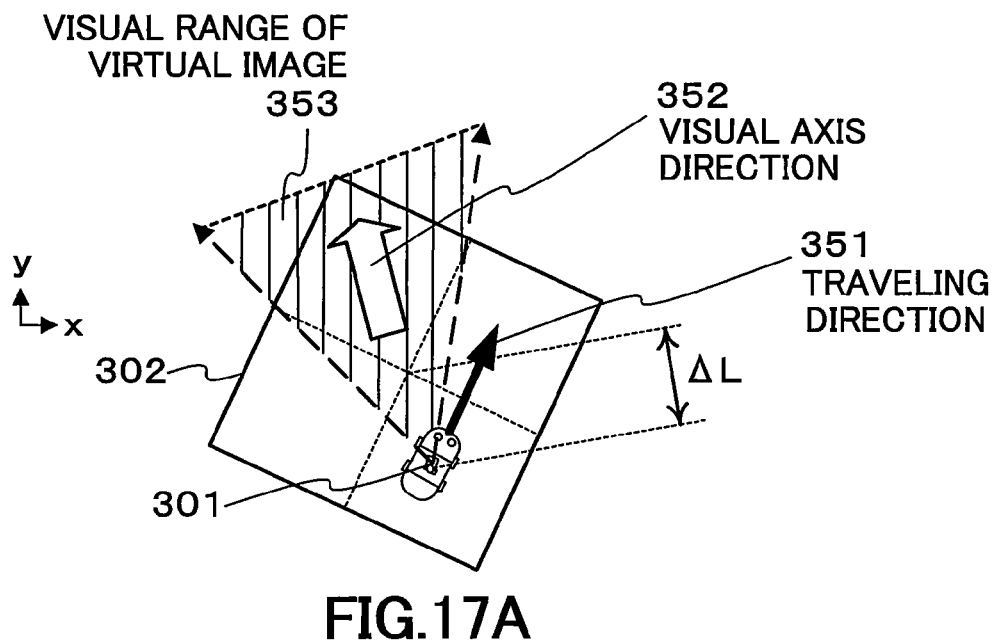
FIG. 17A An example of an arrangement diagram in which a reference direction of a three-dimensional spatial body is changed to a direction of travel of a listening point, and a center point of a three-dimensional spatial body is moved to a visual axis direction.

In addition to the visual axis direction 352, the three-dimensional spatial body 302 is arranged also considering the traveling direction 351 of the listening point 301, and it is also possible to acquire the distribution of the region of overlap and the amount of overlap $V_{OBJ}$ between the three-dimensional spatial body 302 and the object 303. That is, the calculating unit 201, as shown in FIG. 17A, can change the reference direction of the three-dimensional spatial body 302 based on the orientation in which the listening point 301 is traveling, and also move the center position of the three-dimensional spatial body 302 by the predetermined amount ΔL in the visual axis direction 352.

Figure 17B:
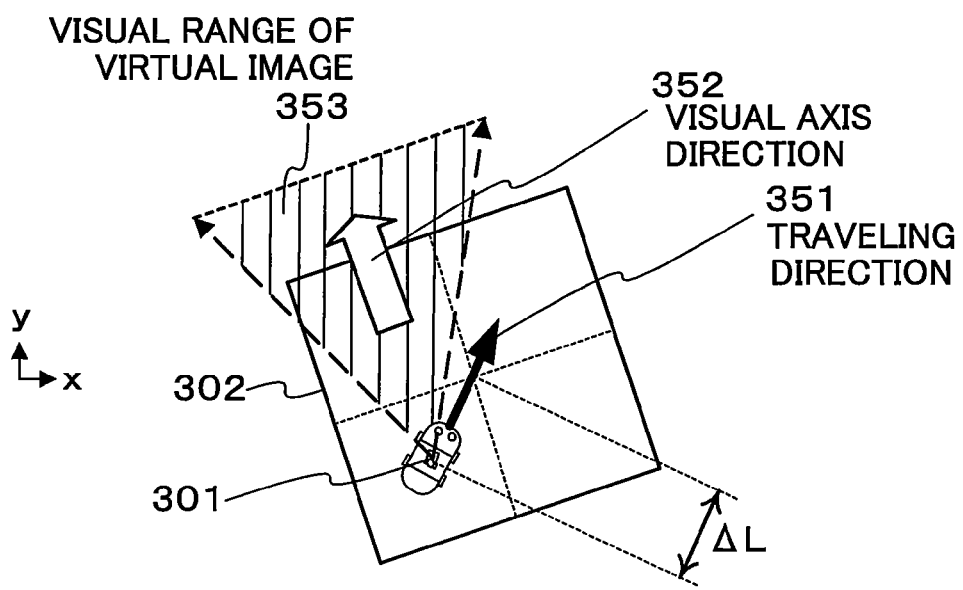
FIG. 17B An example of an arrangement diagram in which a reference direction of a three-dimensional spatial body is changed to a visual axis direction, and a center position of a three-dimensional spatial body is moved to a direction of travel of a listening point.

Further, the calculating unit 201, as shown in FIG. 17B, can change the reference direction of the three-dimensional spatial body 302 based on the visual axis direction 352, and also move the center position of the three-dimensional spatial body 302 by the predetermined amount ΔL in the orientation in which the listening point 301 is traveling.

By thus combining the traveling direction 351 and the visual axis direction 352 of the listening point 301, it is possible to emphasize the modification of the sounds reflected from the direction in which the listening point 301 is traveling, and to determine the localization based on the visual axis direction 352. It is thus possible to obtain a more realistic sound effect. Moreover, also in this case, the calculating unit 201 increases the predetermined amount ΔL as the traveling speed increases, but this is not a limitation.

Other Embodiments

The present invention is not limited to the above embodiments, and various modifications and applications are possible.

With the above embodiments, the three-dimensional spatial body 302 containing the listening point 301 is a rectangular solid, but this is not a limitation. For example, another shape, such as a sphere, may be used. However, the shape of the three-dimensional spatial body 302 desirably has three-dimensional symmetry with respect to the listening point 301 in order to simplify the process for acquiring the amount of overlap $V_{OBJ}$ with the calculating unit 201.

Further, the unit figures constituting the three-dimensional spatial body 302 containing the listening point 301 or the surface thereof are not limited to the above embodiments, and unit figures with different shapes (for example, pyramidal, triangular, etc.) and in different numbers can be used. However, the shape of the unit figures is desirably uniform for all the unit figures, in order to simplify the process for acquiring the amount of overlap $V_{OBJ}$ with the calculating unit 201. Alternately, they may also be variable depending on the game scene, etc.

The calculating unit 201 may be constituted so as to cause the shape of the three-dimensional spatial body 302 containing the listening point 301 to change when predetermined conditions are fulfilled. For example, in a car racing game within the virtual space, if the listening point 301 is the driver's seat of the vehicle object operated by the user, and only the right side window of the driver's seat is opened, the calculating unit 201 expands the region only for the right half of the three-dimensional spatial body 302 from the listening point 301. As a result, the modifying unit 202 can apply an effect which increases the amount of the modification of the sounds reflected by the objects 303 positioned in the right half over the left side, simply and without performing complex calculations.

Alternately, setting a coefficient K(i) corresponding to the unit figures constituting the three-dimensional spatial body 302 containing the listening point 301 in advance, the calculating unit 201 sets a weighting for each unit figure as in Formula 3 for an amount of overlap V(i) corresponding to the unit figures i, and makes the amount of overlap $V_{OBJ}$ the sum of all the unit figures of the region of overlap between the three-dimensional spatial body 302 and the object 303. The calculating unit 201 may also be constituted so as to cause the coefficient K(i) to change when predetermined conditions are fulfilled. For example, in a car racing game within the virtual space, if the listening point 301 is the driver's seat of the vehicle object operated by the user, and only the right side window of the driver's seat is opened, the calculating unit 201 increases coefficient K(i) associated with unit figures present in the right half from the listening point 301. As a result, the modifying unit 202 can apply an effect which increases the amount of the modification of the sounds reflected by the objects 303 positioned in the right half over the left side, simply and without performing complex calculations.

In the above embodiments, the voice processor 200 generates virtual images by arranging the listening point 301 and the objects 303 within the virtual space, displays this on a monitor connected to the image processor 107, and modifies the reflected sounds, but may be constituted such that the process for displaying virtual images by arranging the listening point 301 and the objects 303 within the virtual space is done with a separate information processing device. Further, the voice processor 200 may be constituted so as to be connected with an information processing device by the NIC 109, etc., and to perform only the process for modifying and outputting the reflected sounds.

The above embodiments were described using an orthogonal coordinate system within the virtual space, but this is not a limitation, and it is also possible to use, for example, a polar coordinate system such as spherical coordinates using one radius vector and two arguments. It is also possible to adopt a constitution in which coordinate calculations are performed, with a global coordinate system (world coordinate system) expressing the entire virtual space and a local coordinate system (body coordinate system) for each object 303 being set separately.

In the above embodiments, either a volume value or a surface area value are used as the amount of overlap $V_{OBJ}$, but both can be used. In other words, the calculating unit 201 may be constituted such that both a volume value and a surface area value are calculated as the amount of overlap $V_{OBJ}$. For example, if the volume values of the overlaps of the three-dimensional spatial body 302 with two or more differing objects 303 are the same, the calculating unit 201 can further acquire the surface area value of the overlap, and the modifying unit 202 can perform a process for significantly modifying (for example, making louder) the sound effect for the larger surface area value. Further, a constitution is also possible in which the calculating unit 201 acquires amounts other than the volume value or the surface area value (for example, the traveling speeds, etc., of the listening point 301 and the objects 303) and the modifying unit 202 modifies the sound effects based on the amounts other than the volume value or the surface area value.

For example, if the amounts of overlap $V_{OBJ}$ of the overlaps of the three-dimensional spatial body 302 with two or more different objects 303 are the same, a process may be performed for significantly modifying (for example, making louder) reflected sounds from among the different objects 303, the one that has a smaller distance between the barycenter of the area in which the object 303 is distributed and the listening point 301. In this case, it is possible to use the coordinates closest to the listening point of the object 303, etc., other than the barycentric coordinates.

For example, if the amount of overlap $V_{OBJ}$ between the three-dimensional spatial body 302 and the object 303 are the same, the modifying unit 202 may also change the degree of modification of the reflected sounds according to the traveling speed of the object 303 (the relative speed of the object 303 with respect to the listening point 301).

Note that the present application claims priority based on Japanese Patent Application No. 2005-377381, which is herein incorporated by reference.

INDUSTRIAL APPLICABILITY

As described above, with the present invention, a voice processor, voice processing method, and program favorable for obtaining three-dimensional sound effects within a virtual space can be provided. In particular, the present invention can be simply applied to devices to which it is difficult to equip high-performance hardware, such as generally available home game devices.

The invention claimed is:

1. A voice processor comprising:
a calculating unit which calculates an amount of overlap between a region occupied by a three-dimensional spatial body containing an arrival point of a reflected sound reflected by an object arranged within a virtual space and the object;
a modifying unit which modifies a reflected sound reflected from the object based on the amount of overlap calculated by the calculating unit;
an outputting unit which outputs a reflected sound modified by the modifying unit as a sound to be acquired at the arrival point; an image generating unit which generates an image in which an object arranged within the virtual space is seen from the arrival point within the virtual space; and a visual axis direction acquiring unit which acquires from the image generating unit a visual axis direction in which an object arranged within the virtual space is seen from the arrival point; wherein the calculating unit arranges the three-dimensional spatial body based on the visual axis direction acquired by the visual axis direction acquiring unit and calculates an amount of overlap between the three-dimensional spatial body and the object.

2. The voice processor according to claim 1, wherein the modifying unit modifies a localization of the reflected sound according to a distribution of a region in which the three-dimensional spatial body and the object overlap.

3. A voice processing method comprising:
a calculating step by using a processor of calculating an amount of overlap between a region occupied by a three-dimensional spatial body containing an arrival point of a reflected sound reflected by an object arranged within a virtual space and the object;
a modifying step of modifying a reflected sound reflected from the object based on the amount of overlap calculated by the calculating step;
an outputting step of outputting a reflected sound modified by the modifying step as a sound to be acquired at the arrival point; generating an image in which an object arranged within the virtual space is seen from the arrival point within the virtual space; and acquiring a visual axis direction in which an object arranged within the virtual space is seen from the arrival point; wherein the calculating step arranges the three-dimensional spatial body based on the visual axis direction and calculates an amount of overlap between the three-dimensional spatial body and the object.

4. A program embodied on a non-transitory computer-readable medium for controlling a computer to function as:
a calculating unit which calculates an amount of overlap between a region occupied by a three-dimensional spatial body containing an arrival point of a reflected sound reflected by an object arranged within a virtual space and the object;
a modifying unit (202) which modifies a reflected sound reflected from the object based on the amount of overlap calculated by the calculating unit;
an outputting unit which outputs a reflected sound modified by the modifying unit (202) as a sound to be acquired at the arrival point; an image generating unit which generates an image in which an object arranged within the virtual space is seen from the arrival point within the virtual space; and a visual axis direction acquiring unit which acquires from the image generating unit a visual axis direction in which an object arranged within the virtual space is seen from the arrival point; wherein the calculating unit arranges the three-dimensional spatial body based on the visual axis direction acquired by the visual axis direction acquiring unit and calculates an amount of overlap between the three-dimensional spatial body and the object.

5. A non-transitory computer-readable information recording medium on which is recorded a program for controlling a computer to function as:
a calculating unit which calculates an amount of overlap between a region occupied by a three-dimensional spatial body containing an arrival point of a reflected sound reflected by an object arranged within a virtual space and the object;
a modifying unit (202) which modifies a reflected sound reflected from the object based on the amount of overlap calculated by the calculating unit;
an outputting unit which outputs a reflected sound modified by the modifying unit (202) as a sound to be acquired at the arrival point; an image generating unit which generates an image in which an object arranged within the virtual space is seen from the arrival point within the virtual space; and a visual axis direction acquiring unit which acquires from the image generating unit a visual axis direction in which an object arranged within the virtual space is seen from the arrival point; wherein the calculating unit arranges the three-dimensional spatial body based on the visual axis direction acquired by the visual axis direction acquiring unit and calculates an amount of overlap between the three-dimensional spatial body and the object.

* * * * *

UNITED STATES PATENT AND TRADEMARK OFFICE
CERTIFICATE OF CORRECTION

PATENT NO. : 8,155,324 B2
APPLICATION NO. : 12/159610
DATED : April 10, 2012
INVENTOR(S) : Hiroyuki Nakayama It is certified that error appears in the above-identified patent and that said Letters Patent is hereby corrected as shown below:

Column 24, line 8: Delete "(202)".

Column 24, line 12: Delete "(202)".

Column 24, line 32: Delete "(202)".

Column 24, line 36: Delete "(202)".

Signed and Sealed this
Third Day of July, 2012

David J. Kappos
*Director of the United States Patent and Trademark Office*